United States Patent
Garudadri et al.

(10) Patent No.: US 8,537,197 B2
(45) Date of Patent: Sep. 17, 2013

(54) CONTENT- AND LINK-DEPENDENT CODING ADAPTATION FOR MULTIMEDIA TELEPHONY

(75) Inventors: Harinath Garudadri, San Diego, CA (US); Chandru Sundarraman, San Diego, CA (US); Gajinder Vij, San Diego, CA (US); Naveen B. Srinivasamurthy, Bangalore (IN); Phoom Sagetong, Orange, CA (US); Hyukjune Chung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1148 days.

(21) Appl. No.: 11/972,594

(22) Filed: Jan. 10, 2008

(65) Prior Publication Data

US 2009/0021572 A1     Jan. 22, 2009

Related U.S. Application Data

(60) Provisional application No. 60/884,328, filed on Jan. 10, 2007.

(51) Int. Cl.
   *H04N 7/14* (2006.01)

(52) U.S. Cl.
   USPC .................................... 348/14.12; 348/14.01

(58) Field of Classification Search
   USPC ...................................................... 348/14.01
   See application file for complete search history.

(56) References Cited

U.S. PATENT DOCUMENTS

| | | | |
|---|---|---|---|
| 4,774,587 A | 9/1988 | Schmitt | |
| 5,341,374 A | 8/1994 | Lewen et al. | |
| 5,367,523 A | 11/1994 | Chang et al. | |
| 5,541,919 A | 7/1996 | Yong et al. | |
| 5,550,589 A | 8/1996 | Shiojiri et al. | |
| 5,550,593 A | 8/1996 | Nakabayashi | |
| 5,621,840 A | 4/1997 | Kawamura et al. | |
| 5,768,533 A | 6/1998 | Ran | |
| 5,790,538 A | 8/1998 | Sugar | |
| 5,802,068 A | 9/1998 | Kudo | |
| 5,838,678 A | 11/1998 | Davis et al. | |
| 5,969,764 A | 10/1999 | Sun et al. | |

(Continued)

FOREIGN PATENT DOCUMENTS

| | | |
|---|---|---|
| CN | 1272271 | 11/2000 |
| CN | 1273011 | 11/2000 |

(Continued)

OTHER PUBLICATIONS

Kang, K., et al., "Dynamic Rate Control Mechanism for Large Scale Sessions," Twelfth International Conference on Information Networking Proceedings, 1998. (ICOIN-12). Tokyo, Japan, Jan. 21-23, 1998, pp. 21-24, XP010265270, ISBN: 978-0-8186-7225-5., doi: 10.1109/ICOIN.1998.648346.

(Continued)

*Primary Examiner* — Tuan Nguyen
(74) *Attorney, Agent, or Firm* — Charles Chesney

(57) ABSTRACT

This disclosure describes techniques that can facilitate multimedia telephony. In one example, a method for communication of multimedia data comprises determining a first level of throughput associated with multimedia data communication from a first access terminal to a network, determining a second level of throughput associated with multimedia data communication from the network to a second access terminal based on feedback from the second access terminal to the first access terminal via the network, determining a budget associated with communication of a video unit of the multimedia data, and coding the video unit of the multimedia data based on the budget and the first and second levels of throughput.

34 Claims, 14 Drawing Sheets

(56) References Cited

U.S. PATENT DOCUMENTS

| | | |
|---|---|---|
| 6,002,802 A | 12/1999 | Chujoh et al. |
| 6,111,917 A | 8/2000 | Tomita et al. |
| 6,154,489 A | 11/2000 | Kleider et al. |
| 6,233,251 B1 | 5/2001 | Kurobe et al. |
| 6,330,683 B1 | 12/2001 | Jeddeloh |
| 6,389,034 B1 | 5/2002 | Guo et al. |
| 6,396,956 B1 | 5/2002 | Ribas-Corbera et al. |
| 6,404,776 B1 | 6/2002 | Voois et al. |
| 6,421,387 B1 | 7/2002 | Rhee |
| 6,487,316 B1 | 11/2002 | Fukunaga et al. |
| 6,490,243 B1 | 12/2002 | Tanaka et al. |
| 6,574,247 B1 | 6/2003 | Baggen et al. |
| 6,587,437 B1 | 7/2003 | Lee et al. |
| 6,629,318 B1 | 9/2003 | Radha et al. |
| 6,633,609 B1 | 10/2003 | Ing et al. |
| 6,747,991 B1 | 6/2004 | Hemy et al. |
| 6,862,298 B1 | 3/2005 | Smith et al. |
| 6,865,374 B2 | 3/2005 | Kalluri |
| 6,891,822 B1 | 5/2005 | Gubbi et al. |
| 7,023,915 B2 | 4/2006 | Pian et al. |
| 7,051,358 B2 | 5/2006 | Hakenberg et al. |
| 7,058,085 B2 | 6/2006 | Earnshaw et al. |
| 7,068,086 B2 | 6/2006 | Takeda |
| 7,193,966 B2 | 3/2007 | Gupta et al. |
| 7,197,026 B2 | 3/2007 | Chen et al. |
| 7,206,285 B2 | 4/2007 | Loguinov |
| 7,269,139 B1 | 9/2007 | Williams, Jr. et al. |
| 7,304,951 B2 | 12/2007 | Rhee |
| 7,342,901 B1 | 3/2008 | Zhang et al. |
| 7,356,079 B2 | 4/2008 | Laksono et al. |
| 7,369,497 B2 | 5/2008 | Naruse |
| 7,369,517 B2 | 5/2008 | Dillinger et al. |
| 7,433,408 B2 | 10/2008 | Hatano et al. |
| 7,453,938 B2 | 11/2008 | Haskell et al. |
| 7,492,710 B2 | 2/2009 | Wadekar et al. |
| 7,533,192 B2 | 5/2009 | Otsuka et al. |
| 7,606,427 B2 | 10/2009 | Malayath et al. |
| 7,668,096 B2 | 2/2010 | Ignatowski et al. |
| 8,437,255 B2 | 5/2013 | Jiang |
| 2002/0007416 A1 | 1/2002 | Putzolu |
| 2002/0031336 A1 | 3/2002 | Okada et al. |
| 2002/0054578 A1 | 5/2002 | Zhang et al. |
| 2002/0154640 A1 | 10/2002 | Wei |
| 2002/0191544 A1 | 12/2002 | Cheng et al. |
| 2003/0026277 A1 | 2/2003 | Pate et al. |
| 2003/0152032 A1 | 8/2003 | Yanagihara et al. |
| 2003/0202528 A1 | 10/2003 | Eckberg |
| 2004/0076118 A1 | 4/2004 | Ho et al. |
| 2004/0252761 A1 | 12/2004 | Brown et al. |
| 2005/0013244 A1 | 1/2005 | Parlos |
| 2005/0013245 A1 | 1/2005 | Sreemanthula et al. |
| 2005/0117056 A1 | 6/2005 | Aprea et al. |
| 2005/0152320 A1 | 7/2005 | Marinier et al. |
| 2005/0207392 A1 | 9/2005 | Sivalingham et al. |
| 2005/0207437 A1 | 9/2005 | Spitzer |
| 2005/0210515 A1 | 9/2005 | Roh et al. |
| 2005/0220116 A1 | 10/2005 | Ahn et al. |
| 2005/0243846 A1 | 11/2005 | Mallila |
| 2005/0249231 A1 | 11/2005 | Khan |
| 2005/0259694 A1 | 11/2005 | Garudadri et al. |
| 2005/0283809 A1 | 12/2005 | Kim |
| 2006/0007958 A1 | 1/2006 | Kang et al. |
| 2006/0013263 A1 | 1/2006 | Fellman |
| 2006/0050743 A1 | 3/2006 | Black et al. |
| 2006/0072832 A1 | 4/2006 | Nemiroff et al. |
| 2006/0083243 A1 | 4/2006 | Igarashi et al. |
| 2006/0256756 A1 | 11/2006 | Wakabayashi |
| 2007/0019931 A1 | 1/2007 | Sirbu |
| 2007/0041324 A1 | 2/2007 | Shenoi |
| 2007/0071030 A1 | 3/2007 | Lee |
| 2007/0091815 A1 | 4/2007 | Tinnakornsrisuphap et al. |
| 2007/0091816 A1 | 4/2007 | Lee et al. |
| 2007/0097257 A1 | 5/2007 | El-Maleh et al. |
| 2007/0121706 A1 | 5/2007 | Nakamura et al. |
| 2007/0201406 A1 | 8/2007 | Yoon et al. |
| 2007/0291870 A1 | 12/2007 | Ponnekanti |
| 2008/0056125 A1 | 3/2008 | Kneckt et al. |
| 2008/0170500 A1 | 7/2008 | Ito et al. |
| 2008/0205856 A1 | 8/2008 | Kim et al. |
| 2009/0034610 A1 | 2/2009 | Lee et al. |
| 2009/0046743 A1 | 2/2009 | Hamanaka |
| 2009/0180379 A1 | 7/2009 | Leung et al. |
| 2010/0215053 A1 | 8/2010 | Chakareski et al. |

FOREIGN PATENT DOCUMENTS

| | | |
|---|---|---|
| CN | 1293871 | 5/2001 |
| CN | 1674676 A | 9/2005 |
| EP | 1014739 | 6/2000 |
| EP | 1168732 | 1/2002 |
| EP | 1170957 A2 | 1/2002 |
| EP | 1372304 A2 | 12/2003 |
| EP | 1478137 A1 | 11/2004 |
| EP | 1482681 A1 | 12/2004 |
| EP | 1575225 A2 | 9/2005 |
| EP | 1628446 | 2/2006 |
| EP | 1641147 A1 | 3/2006 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001238256 A | 8/2001 |
| JP | 2001517049 A | 10/2001 |
| JP | 2002016929 A | 1/2002 |
| JP | 2002354141 A | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 | 9/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005192073 A | 7/2005 |
| JP | 2005236783 A | 9/2005 |
| JP | 2005286832 A | 10/2005 |
| JP | 2005303925 A | 10/2005 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 | 12/2003 |
| RU | 2295833 C2 | 3/2007 |
| RU | 2002130511 | 3/2007 |
| WO | WO9823109 A2 | 5/1998 |
| WO | WO9914975 | 3/1999 |
| WO | WO0180477 | 10/2001 |
| WO | WO3001725 A1 | 1/2003 |
| WO | WO03026316 | 3/2003 |
| WO | WO03077462 A1 | 9/2003 |
| WO | 04056028 | 7/2004 |
| WO | WO2004056123 | 7/2004 |
| WO | WO2004084503 A2 | 9/2004 |
| WO | 2004091130 | 10/2004 |
| WO | WO2005004374 A2 | 1/2005 |
| WO | WO2005039209 A1 | 4/2005 |
| WO | 2005122025 | 12/2005 |
| WO | WO2007119086 | 10/2007 |
| WO | WO2008024890 A2 | 2/2008 |

OTHER PUBLICATIONS

Khansari, M., et al., "Low Bit-Rate Video Transmission over Fading Channels for Wireless Microcellular Systems," IEEE Transactions on Circuits and Systems for Video Technology, IEEE Service Center, Piscataway, NJ, US, vol. 6, No. 1, (Feb. 1, 1996), XP011014283, ISSN: 1051-8215.

Stockhammer, Thomas. "Progressive Video Transmission for Packet Lossy Channels Exploiting Feedback and Unequal Erasure Protection," International Conference on Image Processing (ICIP), vol. 2, (Sep. 22, 2002), pp. 169-172, XP010607935, ISBN: 978-0-7803-7622-9.

T.V. Lakshman et al., "VBR Video: Tradeoffs and Potentials", Proceeding of the IEEE, May 1998, vol. 86, No. 5, pp. 952-973.

T.V. Lakshman et al., "Transporting compressed video over ATM networks with explicit-rate feedback control," IEEE Trans. Networking, Oct. 1999, vol. 7, No. 5, pp. 710-723.

Y.-G. Kim et al., "TCP-friendly internet video with smooth and fast rate adaptation and network-aware error control," IEEE Trans. Circ. Sys. Vid. Tech., Feb. 2004, vol. 14, No. 2, pp. 256-268.

G. Cheung et al., "Video transport over wireless networks," IEEE Trans. Multimedia, Aug. 2005, pp. 777-785.

D. Morikawa et al., "A feedback rate control of video stream in best-effort high-speed mobile packet network," The 5th Int. Symp. Wireless Personal Multimedia Comm., Oct. 2002, pp. 27-30.

"ITU-T Study Group 16, rate control for low-delay video communications," No. q15-A-20, 1997.

U.S. Appl. No. 11/445,099, filed May 31, 2006, Yen-Chi Lee.

Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.

Harinath Garudadri et al.: "Rate Adaptation for Video Telephony in 3G Networks" Nov. 12-13, 2007, pp. 342-348.

Kueh V Y H et al.: "Performance evaluation of SIP-based session establishment over satellite—UMTS" VTC 2003—Spring. The 57th IEEE Semiannual Vehicular Technology Conference Proceedings. Apr. 22-25, 2003, vol. 2, Apr. 22, 2003, pp. 1381-1365, XP010862.

Lee M et al: "Video Frame Rate Control for Non-Guaranteed Network Services With Explicit Rate Feedback" IEEE Telecommunication Conference, Nov. 27-Dec. 1, 200; vol. 1, Nov. 27, 2000, pp. 293-297, XP001195580.

Lei Z et al.: "Adaptive video transcoding and streaming over wireless channels" Journal of Systems & Software, vol. 75, No. 3, Mar. 1, 2005, pp. 253-270, XP004656968.

3GPP TR 26.914, "Multimedia telphony over IP Multimedia Subsystem (IMS): Optimization opportunities" 2006.

"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.

International Search Report, PCT/US2008/050822, International Search Authority—European Patent Office—Oct. 7, 2008.

Written Opinion—PCT/US2008/050822, International Search Report—European Patent Office—Oct. 7, 2008.

Partial ISR—International Search Report, PCT/US2008/050822, International Search Authority—European Patent Office—Jul. 18, 2008.

3GPP TR 26.902 V1.0.0, "3RD Generation Partnership Project; Technical Specification Group Services and System Aspects; Video Codec Performance," (Release 7)(Mar. 2007).

3GPP TS 26.114 v1.2.0 (Dec. 13, 2006), "3rd Generation Partnership Project; Technical Specification Group Services and System Aspects-IP multimedia subsystem (IMS) multimedia telephony; media handling and interaction," (Release 7) TSG-SA4 internal working draft.

3GPP TS 34.108 v6.5.0, "3rd Generation Partnership Project; Technical Specification Group Radio Access Network Common test environment for UE conformance testing," (Release 6) (Dec. 2006).

3GPP2 C.R1008 v1.0, "cdma2000 Multimedia evaluation methodologies," Jan. 12, 2007.

3GPP2: "Packet Switched Video Telephony Services (PSVT/MCS)" 3GPP2, C.S0055-0, Version 1.0, Dec. 2007, XP002542622 p. 32, paragraph 8—p. 33.

CDMA2000 High Rate Packet Data Air Interface Specification 3GGP2 CS0024-A V10, [Online] (Mar. 1, 2004), p. 13-46 XP000863923.

D. Singer et al., "A general mechanism for RTP Header Extensions," RFC 5285, IETF Internet Draft (Jul. 2008).

Fidler M, "Real-Time Multimedia Streams in a Differentiated Services Network," Computer Communications and Networks, 2001. Proceedings Tenth International Conference on Oct. 15-17, 2001, Piscataway, NJ, USA, IEEE, Oct. 15, 2001, pp. 380-385, XP010562121.

H. Schulzrinne et al.,"RTP: A Transport Protocol for Real-Time Applications," IETF RFC 3550 (2003).

He et al.: "A Linear Source Model and a Unified Rate Control Algorithm for DCT Video Coding", IEEE Transactions on Circuits and Systems for Video Technology, IEEE Service Center, Piscataway, NJ, US, vol. 12 No. 11, Nov. 2002, p. 970-982.

Hosein, et al.: "Dynamic Power Headroom Threshold for Mobile Rate Determination in a CDMA Network", Vehicular Technology Conference, 2004, VTC 2004-Spring, 2004 IEEE 59th Milan, Italy, May 17-19, 2004, Piscataway, NJ, USA, IEEE, May 17, 2004, pp. 2404-2408.

I. Johansson et al., "Support for non-compound RTCP in RTCP AVPF profile, opportunities and consequences," IETF Internet Draft Dec. 20, 2006; Expires Jun. 23, 2007.

ISO/IEC 14496-2, International Standard, Information technology—Coding of audio-visual objects—Part 2: Visual, Third edition Jun. 1, 2004.

ITU-T H.263 "Series H: Audiovisual and Multimedia Systems Infrastructure of audiovisual service—Coding of moving video: Video coding for low bitrate communication," (Jan. 2005), 226 pages.

ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

Kalavakunta R et al: "Evolution of mobile broadband access technologies and services consideration and solutions for smooth migration from 2G to 3G networks" Personal Wireless Communications, 2005. IICPWC 2005. 2005 IEEE International Conference on Jan. 23-25, 2005, pp. 144-149, xp010799046.

Kamel I et al.: "A Study on Scheduling Multiple Priority Requests in Multimedia Servers," Multimedia Computing and Systems, 1999. IEEE International Conference on Florance, Italy Jun. 7-11, 1999, Los Alamitos, CA, USA, IEEE comput. Soc., US, vol. 2, Jun. 7, 1999, pp. 395-399, XP010519422.

Keller R et al.: "An Active Router Architecture for Multicast Video Distribution," Infocom 2000. Nineteenth Annual joint Conference of the IEEE Computer and Communications Societies. Proceedings IEEE Tel Aviv, Israel Mar. 26-30, 2000, Piscataway, NJ, USA, pp. 1137-1146.

Kikuchi Toshiba T Nomura Neg S Fukunaga Oki Y Matsui Matsushita H Kimata Ntt Y: "RTP Payload Format for MPEG-4 Audio/Visual Streams" IETF Standard, Internet Engineering Task Force, IETF, CH, Nov. 2000, pp. 1-21, XP015008799 ISSN: 0000-0003.

Lakshman T et al.: "The Drop from Front Strategy in TCP and in TCP over ATM," Proceedings of IEEE Infocom 1996. Conference on Computer Communications. Fifteenth Annual Joint Conference of the IEEE Computer and Communications Societies. Networking the Next Generation, Mar. 24-28, 1996, vol. 3, conf. 15, Mar. 24, 1996, pp. 1242-1250, XP000622260.

Lu, X; et. al: "Understanding video quality and its use in feedback control" Packet Video 2002, Pittsburgh,PA USA 2002.

Meng-Huang Lee et al.: A Predictable High-Throughput File System for Video Conference Recording Systems, Man and Cybernetics, 1995. Intelligent Sytmes for the 21st Century, IEEE International Conference on Vancouver, BC, Canada Oct. 22-25, 1995, New York, vol. 5, Oct. 22, 1995, pp. 4296-4301, XP010195015.

Myeong-Jin Lee et al.: "Video Frame Rate Control for Non-Guaranteed Network Services with Explicit Rate Feedback," Proceedings of Global Telecommunications Conference, pp. 293-297, 2000, XP002427548.

Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6—p. 41.

Reininger D et al.: "VBR MPEG Video Coding with Dynamic Bandwidth Renegotiation," Communications-Gateway to Globalization. Proceedings of the Conference on Communications. Seattle, Jun. 18-22, 1995, ICC, New York, IEEE, US, vol. 3, Jun. 18, 1995, pp. 1773-1777.

RFC 2190 C. Zhu et al.: "RTP Payload Format for H.263 Video Streams," Network Working Group, pp. 1-12, Sep. 1997.

RFC 2429 C, Borman et al.: "RTP Payload Format for the 1998 Version of ITU-T Rec. H.263 Video (H.263+)," Network Working Group, pp. 1-17, Oct. 1998.

Ruiz, P. et el.: "Adaptive Multimedia Applications to Improve User-perceived QoS in Multihop Wireless AI hoc Networks," Proceedings of the IEEE Int-rnation-1 Conference on Wireless Lane and Horne Networks (1CWLHN 2002) Online] Aug. 2002, pp. 673-684, XP002466712.

Technical Specification Group Radio Access Network: "3GPP TR25.848 V4.0.0 Physical Layer Aspects of UTRA High Speed Downlink Packet Access (Release 4)" 3GPP TR 25.848 V4.0.0, Mar. 2001, pp. 1-89, XP002189517.

Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.

"TIA/EIA/IS-856 CDMA2000 High Rate Packet Data Air Interface Specification, " Apr. 4.

"Video Codec Test Model, Near-Term Version 8 (TMN8) Revision 1," ITU-T Telecommunication Standardization Sector of ITU, Geneva, CH, vol. Q15/16, Sep. 8, 1997, pp. I-III, 1, XP001074663.

Zhihai He et al., "Optimum Bit Allocation and Accurate Rate Control for Video Coding via p-Domain Source Modeling," IEEE Transactions on Circuits and Systems for Video Technology, vol. 12, No. 10, Oct. 2002, p. 840-849.

3GPP S4-060613 "MTSI Dynamic Video Rate Adaptation", Nov. 2006, pp. 1-6.

3GPP TS 26.234 v7.1.0 (Dec. 2006), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.

"Simulation Results for MTSI Dynamic Video Adaptation Signalling", 3GPP TSG-SA WG4 #42 S4-070056, 2007.01.29, pp. 1-12.

Qun-Hua, Wang et al., "The Application of a Simple TCP-friendly Congestion/Rate Control Arithmetic on Multimedia Teaching System", Computer and Information Technology, Apr. 30, 2007, pp. 28-30, vol. 15 No. 2.

CONTENT- AND LINK-DEPENDENT CODING ADAPTATION FOR MULTIMEDIA TELEPHONY

This application claims the benefit of U.S. provisional application No. 60/884,328, filed Jan. 10, 2007 and entitled "Feedback Based Network Adaptive Source Coding For Packet Switched Multimedia Telephony," the entire content of which is incorporated herein by reference.

TECHNICAL FIELD

This disclosure relates to wireless communication and more particularly, to communication techniques that support multimedia telephony.

BACKGROUND

Multimedia telephony, commonly called video telephony (VT), is desirable for wireless and wire-based communication. In multimedia telephony, two or more users communicate audio information and video information to one another via wired or wireless communication or a combination of both. The communication could also include other media elements such as text, still images, or other information. For example, one or more of the users may operate multimedia telephony on a wireless communication handset, while other users may operate multimedia telephony on "wired" or "landline" VT terminals. The handsets and/or terminals may capture audio information from a user, and may be equipped with video cameras to capture video information. The audio and video information can be communicated to the other device, which decodes and presents the audio and video information to another user. A wide variety of communication protocols and network configurations may be capable of supporting multimedia telephony applications.

SUMMARY

In general, this disclosure describes various techniques that may be used to facilitate multimedia telephony. The techniques allow for content- and link-dependent coding of multimedia units, such as video frames. The techniques may rely on measurement of uplink and downlink throughput. Media units may be defined, and then coded when a defined media unit comprises data that can be accommodated by both the uplink and the downlink. The uplink throughput may be measured at the encoding device, and the downlink throughput may be measured at the decoding device. The downlink throughput may be fed back to the encoding device. The techniques described in this disclosure facilitate adaptation of the encoding device to accommodate link conditions of the uplink and downlink. Video units such as video frames, in particular, may be encoded based on a bit budget defined for the video units and the first and second levels of throughput associated with the uplink and downlink respectively.

In one example, this disclosure provides a method for communication of multimedia data, the method comprising determining a first level of throughput associated with multimedia data communication from a first access terminal to a network, determining a second level of throughput associated with multimedia data communication from the network to a second access terminal based on feedback from the second access terminal to the first access terminal via the network, determining a budget associated with communication of a video unit of the multimedia data, and coding the video unit of the multimedia data based on the budget and the first and second levels of throughput.

In another example, this disclosure provides an apparatus that communicates multimedia data, the apparatus comprising a first token buffer module that determines a first level of throughput associated with multimedia data communication from the apparatus to a network, a second token buffer module that determines a second level of throughput associated with multimedia data communication from the network to an access terminal based on feedback from the access terminal to the apparatus, a residual module that determines a budget associated with communication of a video unit of the multimedia data, and a coding module that codes the video unit of the multimedia data based on the budget and the first and second levels of throughput.

In another example, this disclosure provides an apparatus for communication of multimedia data, the apparatus comprising means for determining a first level of throughput associated with multimedia data communication from the apparatus to a network, means for determining a second level of throughput associated with multimedia data communication from the network to an access terminal based on feedback from the access terminal to the apparatus via the network, means for determining a budget associated with communication of a video unit of the multimedia data, and means for coding the video unit of the multimedia data based on the budget and the first and second levels of throughput.

In another example, this disclosure provides a computer program product including a computer readable medium comprising instructions to determine a first level of throughput associated with multimedia data communication from a first access terminal to a network, determine a second level of throughput associated with multimedia data communication from the network to a second access terminal based on feedback from the second access terminal to the first access terminal via the network, determine a budget associated with communication of a video unit of the multimedia data, and code the video unit of the multimedia data based on the budget and the first and second levels of throughput.

In another example, this disclosure provides an access terminal (AT) comprising an antenna that sends and receives wireless communications to and from a network, a first token buffer module that determines a first level of throughput associated with multimedia data communication from the AT to the network, a second token buffer module that determines a second level of throughput associated with multimedia data communication from the network to another AT based on feedback from the other AT, a residual module that determines a budget associated with communication of a video unit of the multimedia data, and a coding module that codes the video unit of the multimedia data based on the budget and the first and second levels of throughput.

In another example, this disclosure provides a method for communication of multimedia data, the method comprising receiving first multimedia data sent from a first AT to a second AT, wherein the first multimedia data is communicated to the second AT from a network, measuring throughput from the network to the second AT over an observation window, and sending, from the second AT to the first AT, information indicative of a level of throughput measured from the network to the second AT over the observation window.

In another example, this disclosure provides an apparatus for communication of multimedia data, the apparatus comprising a receiver module that receives first multimedia data sent from an AT to the apparatus, wherein the first multimedia data is communicated to the apparatus from a network, a throughput measuring module to measure throughput from the network to the apparatus over an observation window, and a transmitter module that sends, from the apparatus to the AT, information indicative of a level of throughput measured from the network to the apparatus over the observation window.

In another example, this disclosure provides an apparatus for communication of multimedia data, the apparatus comprising means for receiving first multimedia data sent from an AT to the apparatus, wherein the first multimedia data is communicated to the apparatus from a network, means for measuring throughput from the network to the apparatus over an observation window, and means for sending, from the apparatus to the AT, information indicative of a level of throughput measured from the network to the apparatus over the observation window.

In another example, this disclosure provides a computer program product including a computer readable medium comprising instructions to receive first multimedia data sent from a first AT to a second AT, wherein the first multimedia data is communicated to the second AT from a network, measure throughput from the network to the second AT over an observation window, and send, from the second AT to the first AT, information indicative of a level of throughput measured from the network to the second AT over the observation window.

In another example, this disclosure provides an AT comprising an antenna that sends and receives wireless communications to and from a network, a receiver module that receives first multimedia data sent from another AT, wherein the first multimedia data is communicated from the other AT to the network and to the AT from the network, a throughput measuring module to measure throughput from the network to the AT over an observation window, and a transmitter module that sends, from the AT to the other AT, information indicative of a level of throughput measured from the network to the AT over the observation window.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
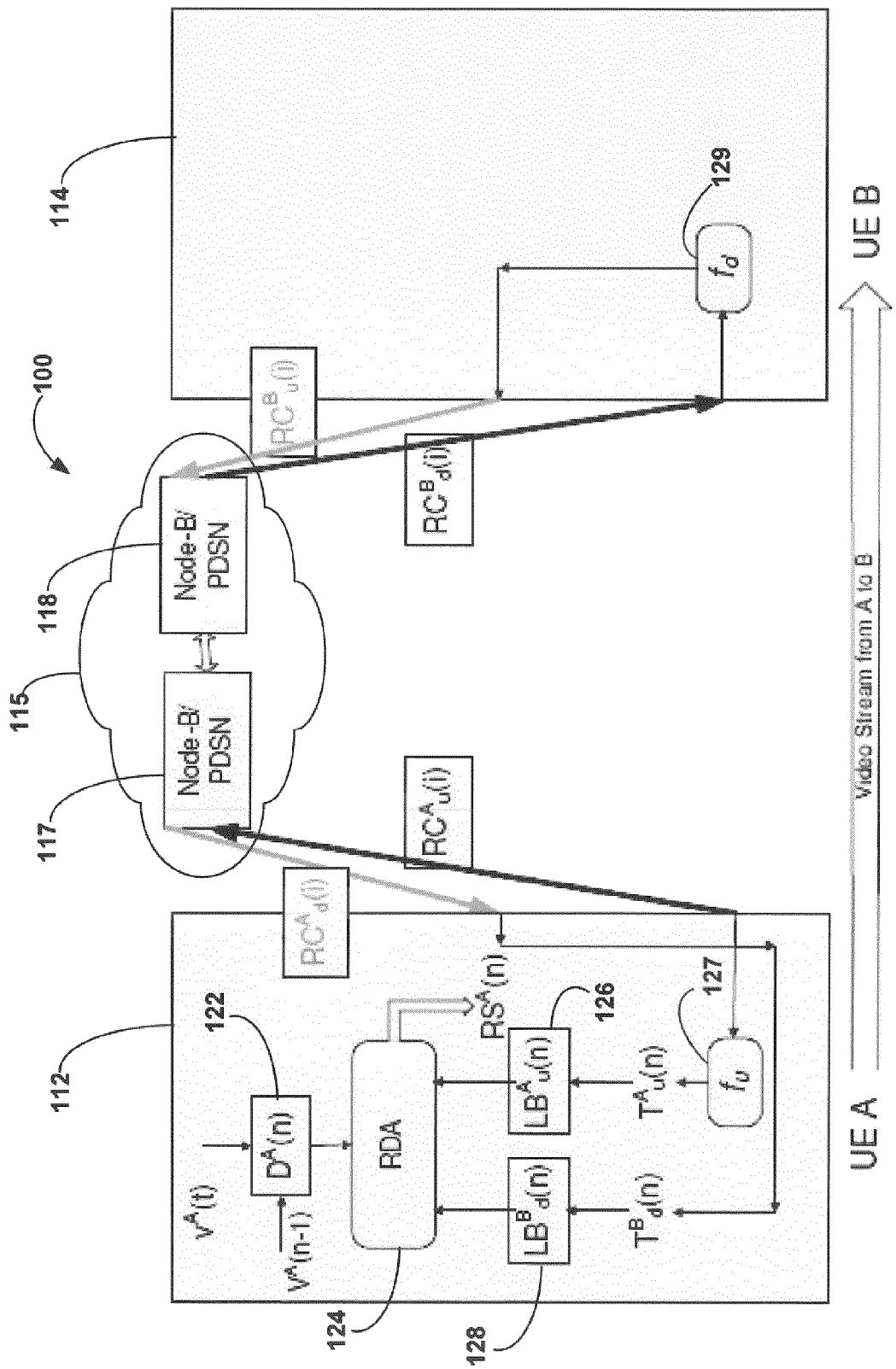
FIG. 1 is a block diagram of one exemplary system that uses a feedback based rate adaptation for multimedia telephony.

Various aspects of the disclosure are described below. It should be apparent that the teachings herein may be embodied in a wide variety of forms, and that any specific structure, function, or both being disclosed herein is merely representative. Based on the teachings herein, one of ordinary skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In general, this disclosure addresses challenges that are applicable to packet switched video telephony (PSVT) in 3G wireless networks such as High Speed Packet Access (HSPA), High Rate Packet Data (HRPD), or the like. Techniques are described that can improve PSVT service in 3G wireless networks. In HSPA/HRPD, temporary decrease in available bandwidth can occur based on the user's location in the cell and/or system loading conditions. This can result in significant increase in observed packet latency, potentially resulting in dropped packets at the receiver. To overcome this problem, the techniques of this disclosure provide a feedback-based rate adaptation scheme. The proposed scheme is capable of adapting the video encoder bitrate to the varying channel bandwidth and may minimize the packet latency. The described techniques may match an encoded source rate to varying channel conditions without making any piecewise constant bitrate (CBR) assumptions on the channel. The techniques may be applicable to any setting in which uplink and/or downlink is a wireless link. Uplink refers to communication from user equipment (UE) to a network node (such as a base station), and downlink refers to communication from a network node to UE.

In the proposed scheme an observed throughput may be monitored on the uplink (e.g. from a sending mobile device to the network) and on the downlink (e.g. from the network to the receiving mobile device). The desired target data rate may be determined based on observed throughput of the uplink and downlink. Based on the source variability and the desired target data rate, the described algorithm may control the encoding time and packet size (e.g. number of bytes) of video frames scheduled for transmission. In general, the term "throughput" refers to a total accumulation of data that occurs between two instances of time. Thus, throughput is given in units of data, such as a total number of bits. According to this disclosure the number of packets and sizes of such packets can be measured over an observation window. In this case, throughput is the amount of data associated with the received packets during a defined (but possibly arbitrary) observation window. In one example, the observation window may comprise an amount of time between two successive coded frames. Thus, throughput is not a measure of data rate, but is a measure of data. The observation window may define two instances of time over which data is accumulated to define the throughput for that period.

In the multimedia communication for VT, audio information may be sent regardless of whether any video information is sent. Video information may comprise video units, such as video frames, scheduled for transmission based on a negotiated data rate and frame rate between the devices of the VT session. According to this disclosure, however, the coding and sending of video units may be limited due to measured throughput constraints on either the uplink or the downlink. According to this disclosure, the phrase "multimedia data" may include audio information such as audio frames and video information such as video frames, and may also include speech, text, still images, other types of data, or any combinations.

This disclosure also presents simulation results of the proposed approach, based on approved specifications and common simulation conditions adopted in the 3rd Generation Partnership Project (3GPP) and International Telecommunication Union (ITU). This disclosure shows that the one-way delay can be significantly reduced by providing timely feedback of observed throughput from the receiving mobile device to the sending mobile device. By using a feedback message once every 200 ms, this disclosure shows that 95 percent of the packets may be delivered with a one-way delay under 250 ms. This disclosure also shows the proposed algorithm may be capable of graceful degradation based on available system resources and user's location within a given cell.

The discussion below considers a problem of delivering video over wireless networks with low latency in order to support conversational services, e.g., commonly referred to as video telephone (VT). In conventional video encoders, the encoders may generate variable bitrate (VBR) streams by keeping constant visual quality due to changing scene characteristics. These bitstreams can be packetized in variable size application data units (ADUs) for transmission. Such streams can be delivered over a CBR channels with desirable statistical multiplexing gains, albeit with some inevitable latency.

However, over-the-air resources in wireless networks such as HSPA are shared among many users during a session, compared with dedicated bandwidth to all users for the call duration, as in circuit switched services. When users move to a poor location in the cell and/or system load increases due to other factors, the available bandwidth is lower than that negotiated during session setup, resulting in VBR channels. Note that this problem is different from problems commonly encountered on conventional best effort networks (e.g. the Internet) where congestion typically implies that no packets are delivered. Here, due to congestion on uplink and/or downlink, packets are still delivered, but the available bandwidth may be reduced. This may result in a longer time to deliver the video packets to the receiving mobile device, increasing the latency. One may observe that the latency can increase due to congestion on the uplink or downlink or due to larger video packets that result from high motion and scene changes.

In the context of HSPA and High Rate Packet Data (HRPD), the available bandwidth to the User Equipment (UE) on uplink and downlink depend on several aspects, some of which are predictable (e.g. Service Providers Quality of Service (QoS) policies, system load, or other predicable factors) and some of which are unpredictable (e.g. UEs geometry, channel conditions, or other unpredictable factors). In addition, the variability of the source characteristics may be unpredictable in real-time conversational applications.

Thus, when the sender generates large video packets during periods of congestion on either uplink or downlink, it may take longer for the system to deliver these packets and as a result, the end-to-end latency can build up. In order to address this, this disclosure provides a dynamic rate adaptation scheme. In this approach, the sender may monitor the channel throughput in the uplink. Simultaneously, the receiver may calculate the channel throughput on the downlink and feed this information back to the sender. The video encoder device at the sender maintains two independent token buckets for uplink and downlink, respectively, which are updated based on the respective channel throughput observed. The video encoder device may consider available throughput on both the uplink and downlink, independently, and compare these available throughputs to a budget associated with coding a current video frame. The budget may also adapt if throughput is not sufficient, as the budget may comprise the residual data of a current frame (current in time), which is coded relative to a previously coded frame. Although the available throughput may accumulate over time, the amount of throughput needed for a current frame may also increase over time due to temporal scene changes in the video sequence being sent. That is to say, the necessary bit budget needed to code a frame may increase as more time elapses from a previously coded frame.

The events leading to congestion at the sender's uplink and the receiver's downlink need not be related. By maintaining two independent token buckets in a sending device, an encoder can factor uplink and downlink conditions along with source variability into consideration in its operation. At various encoding opportunities, the bit budget required to generate a frame of desired target quality may be estimated. If adequate levels of throughput are available (as determined by the token buckets), the frame is encoded and transmitted. Otherwise, the current frame may be skipped (i.e., not encoded) and the encoder may wait until sufficient throughput is available. Following a frame skip, however, the encoder may update throughput and the necessary bit budget more quickly than would otherwise occur in a negotiated session between the two devices. For example, if a frame rate of 10 frames per second is established, following a frame skip, the techniques of this disclosure may code and send a frame shortly thereafter, and not require the encoder to wait unit the next frame is scheduled.

In contrast to conventional techniques, the proposed scheme of this disclosure utilizes feedback, but the feedback is from the receiving UE to the sending UE. This minimizes changes to deployed network elements (e.g. gateways, wireline to wireless edge routers, Node-B, schedulers, etc.) by limiting the system design to application layer (e.g. source codec) and real time transport (RTP) layer. Consequently, lower layer protocol stack implementations in deployed network elements may not require modifications and/or interface changes. In the techniques of this disclosure, the sender monitors available throughput on the uplink and relies on observed throughput on the downlink based on information fed back by the receiver. The source encoder may then estimate the bit budget required to capture source variations and trigger dynamic rate adaptation to match uplink and downlink characteristics accordingly. In addition, it may be possible to identify many other metrics that can be measured and fed back to improve system level performance of conversational services. This disclosure documents and describes methodologies and common conditions to evaluate low-latency conversational services in 3G networks, when the source, uplink, and downlink characteristics are all varying concurrently.

It may be possible to evaluate various alternatives using the methodologies presented in this disclosure. This disclosure demonstrates the feasibility of the proposed scheme in a simulated 3GPP Release-6 network using multi-user, multi-cell, system level event-driven approach. The network layout and configurations can be based on test environment for UE conformance testing, such as a layout and configuration specified by 3GPP. For HSPA, the analysis of the described techniques uses assumptions specified by 3GPP. As described herein, a packet switched video telephony service was simulated, using H.263+ video codec and RTP packetization. For the video sources and objective metrics, this disclosure followed the multimedia evaluation methodologies. System level performance analysis is generally provided for conversational services. The results discussed below can be replicated using the information of this disclosure.

FIG. 1 is a block diagram of one exemplary system 100 that uses a feedback based rate control for multimedia telephony. In particular, FIG. 1 shows a block diagram of one exemplary feedback based rate control system 100 comprising two UEs 112 and 114 that communicate via a network 115. UE A 112 and UE B 114 represent the sender and the receiver of a video stream respectively. UE A 112 and UE B 114 may include transmitters and receivers, but these components are not shown in FIG. 1 for ease of illustration and simplicity. UE A 112 and UE B 114 may also include encoders and decoders (or integrated encoder-decoders "CODECs"), but these components are not shown for ease of illustration and simplicity. In this disclosure, the term coding refers to encoding, decoding, or both. The illustrated components of UE A 112 and UE B 114 in FIG. 1 may be viewed as being components of CODECs of devices 112, 114, or could be considered to be components that manipulate data prior to coding by a CODEC of devices 112, 114.

This disclosure uses superscripts A or B to represent the UE and subscripts u, d to denote uplink and downlink, respectively. Uplink refers to a data communication channel to UE 112 (e.g., from network to UE 112) and downlink refers to a data communication channel from UE 112 (e.g., from network 115 to UE 114). Nodes 117 and 118 within network 115 may represent Packet Data Serving Nodes (PDSNs) that provide data service to UEs 112 and 114 respectively. More generally, however, nodes 117 and 118 could be replaced with any type of access points (APs), including nodes, base stations, any suitable network equipment, or possibly other UEs or ATs.

UEs 112 and 114 may comprise any of a wide variety of access terminals (ATs) such as wireless communication devices, VT handsets, personal digital assistants (PDAs), laptop or desktop computers, or any type of device that includes VT functionality. It should be noted, however, that aspects of this disclosure are not necessarily limited to wireless settings. The techniques may also be used with non-wireless, e.g., wire-based components of a network as long as either the uplink or downlink is wireless. The data stream from UE B 114 to UE A 112 is shown in gray lines, while the data stream from UE A 112 to UE B 114 is shown in black lines. Communications from node 117 to UE A 112 are labeled $RC^A_d(i)$. Communications from UE A 112 to node 117 are labeled $RC^A_u(i)$. Communications from node 118 to UA B 114 are labeled $RC^B_d(i)$. Communications from UA B 114 to node 118 are labeled $RC^B_u(i)$.

As noted, nodes 117 and 118 could be replaced with any type of access points (APs). An access point or node may comprise a Packet Data Serving Node (PDSN), a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Relay Station, or some other terminology. UEs may be replaced by ATs, and UEs or ATs may comprise a subscriber unit, a mobile station, a remote station, a remote terminal, an access terminal, a user terminal, a user agent, a user device, or any type of user equipment such as a mobile station, a cellular telephone, a cordless telephone, a personal digital assistant ("PDA"), a handheld device having wireless connection capability, or some other suitable processing device connected to a wireless modem.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

At UE A 112, frame residual $D^A(n)$ is computed via frame residual unit 122 for the current video frame v(t) at the sampled time instance of n, using the predicted version of the previously encoded frame $V^A(n-1)$. This frame residual is used by rate decision algorithm (RDA) unit 124 along with the token information from the uplink token bucket $LB_u^A(n)$ unit 126 and downlink token bucket $LB_d^B(n)$ unit 128. If the size estimated by RDA unit 124 for the current frame residual is less than the minimum of the tokens in either of token bucket units $LB_u^A(n)$ 124 or $LB_d^B(n)$ 126, then the current frame is encoded, and if not, the current frame is not encoded. $RS^A(n)$ is the size of the video packet scheduled for transmission at time n. In this manner, RDA unit 124 ensures that the encoded frame satisfies the minimum constraint imposed by either the uplink or downlink. The uplink token bucket unit $LB_u^A(n)$ 124 is updated (tokens added) based on the channel throughput on the uplink and a function $f_u$ (labeled 127) of the buffer occupancy. Similarly, the downlink token bucket $LB_d^B(n)$ is updated (tokens added) based on the channel throughput on the downlink and a function $f_d$ (labeled 129) of the buffer occupancy buffer occupancy.

One aspect of the techniques described herein is to use two separate token buckets (e.g. units 126 and 128), thus enabling independent tracking of the uplink and downlink channel characteristics. Tokens may be inserted into the token bucket units 126 and 128 as a function of the respective observed channel throughputs, negotiated QoS, and elapsed time. Tokens may be removed from the token buckets based on transmitted frame sizes. Tokens generally refer to any units indicative of an amount of information that can be sent on the uplink or the downlink.

Figure 2:
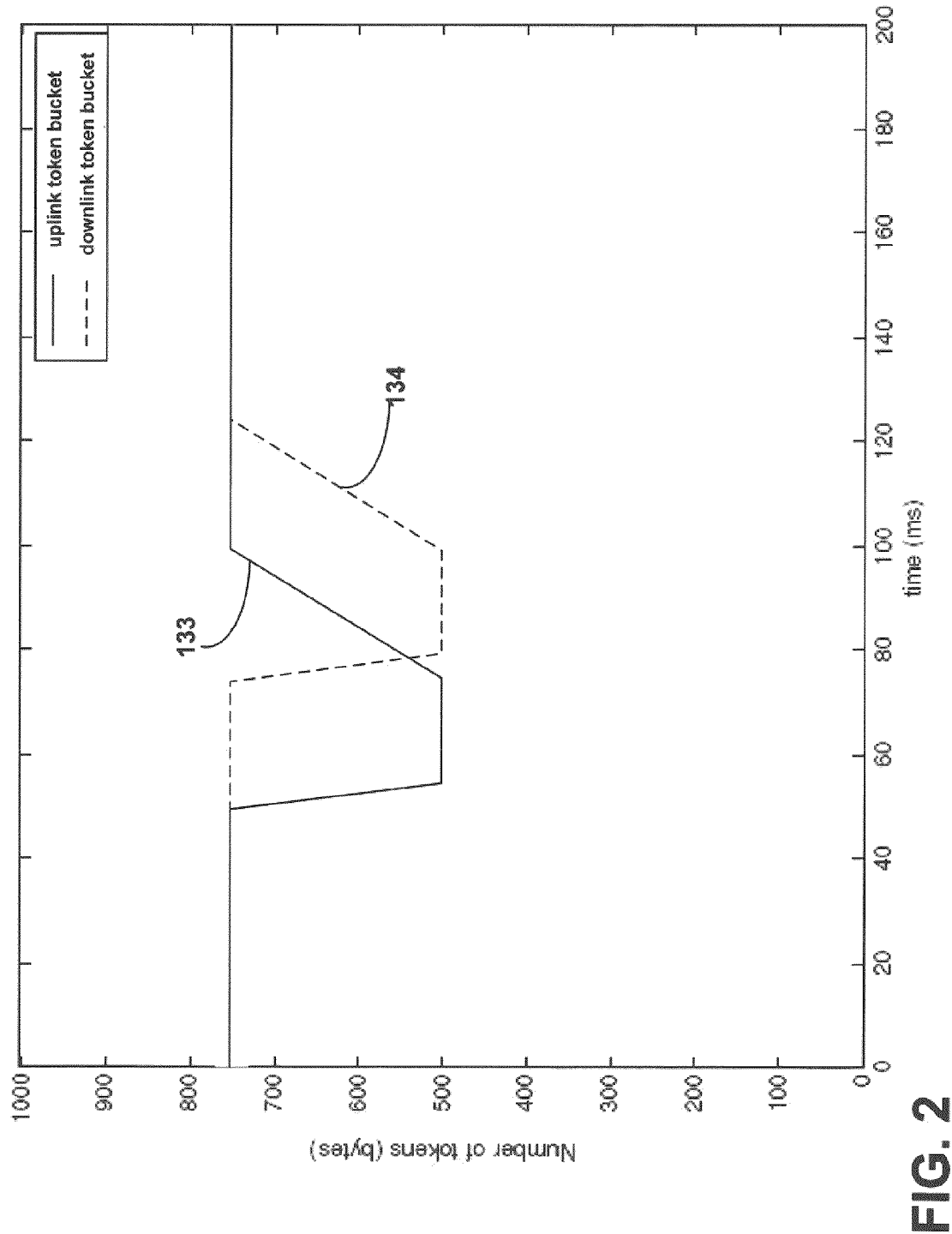
FIGS. 2 and 3 are graphs illustrating tokens as a function of time when two separate token buckets are used to track the uplink and downlink independently, or when one shared token bucket is used for both the uplink and downlink.
Figure 3:
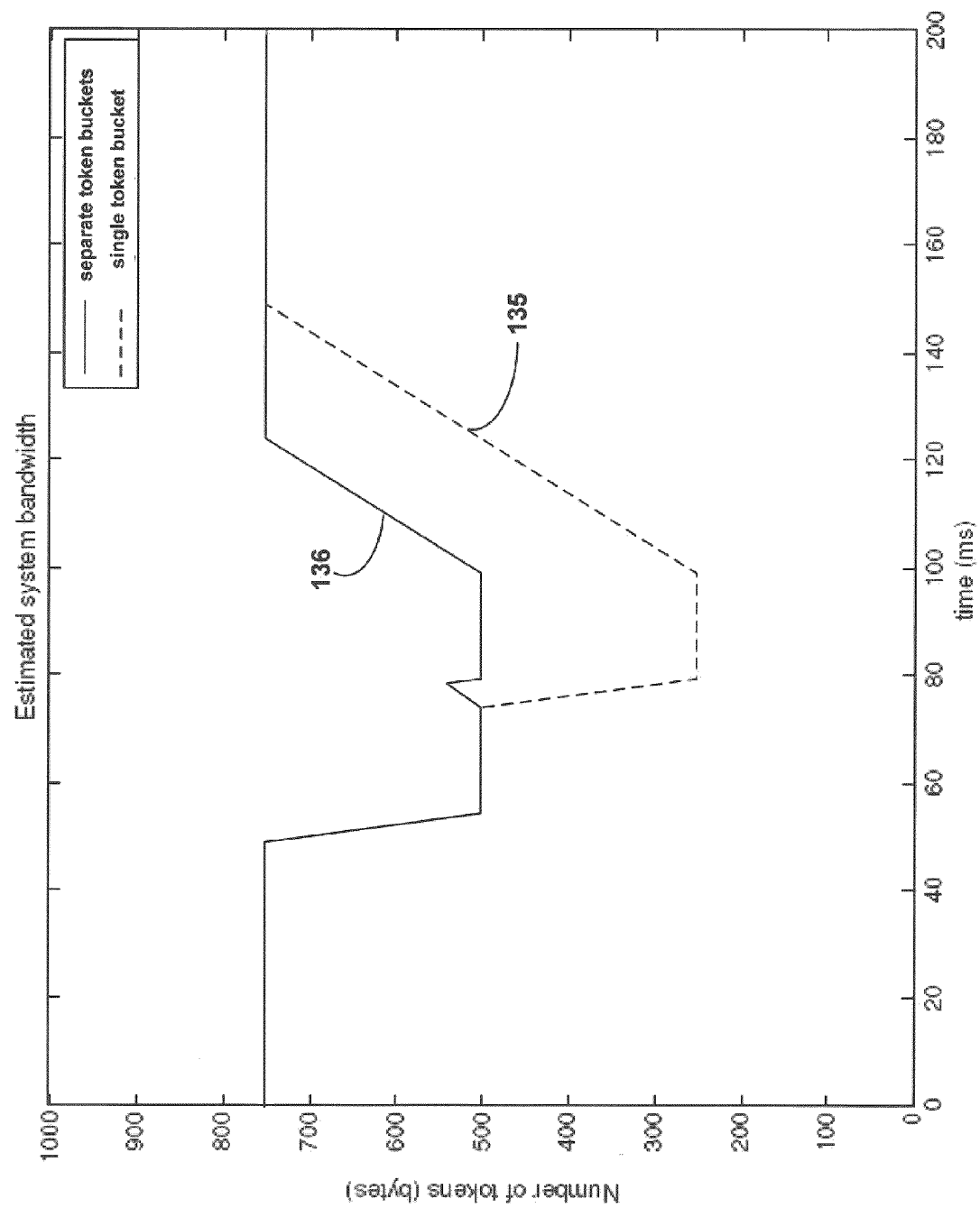

FIGS. 2 and 3 are graphs illustrating one motivation for using two separate token buckets for uplink and downlink. In the example graph of FIG. 2, congestion initially occurs on the uplink and the number of tokens in the uplink token bucket then drops. After the end of congestion the number of tokens slowly increases back to the maximum value as shown by the solid line 133 in FIG. 2. In the example of FIG. 2, however, before the build-up of tokens is completed, congestion occurs on the downlink (as shown by the dashed line 134 in FIG. 2). The dash-dot line 135 in FIG. 3 shows the number of tokens in a single token bucket due to the effect of these two independent events. In the single token bucket example of FIG. 3, however, underestimation of the system bandwidth may occur, since system bandwidth is generally the minimum of the uplink and downlink bandwidths. Therefore, by using two token buckets, both the uplink and downlink bandwidths can be independently tracked and hence the system bandwidth can be tracked more accurately (as shown by the solid line 136 in FIG. 3).

At every encoding opportunity, tokens may be added to the uplink and downlink token buckets represented by $LB_u^A(n)$ unit 126 and $LB_d^B(n)$ unit 128 based on the observed throughputs on uplink and downlink channels, respectively. The throughput is the total channel throughput from the previous encoding opportunity to the current time. The uplink throughput $T_u^A(n)$ and $T_d^B(n)$ may be computed as follows:

$$T_u^A(n) = \sum_{i \in k_u(n)} RC_u^A(i) \times TTI_u^A(i) \quad (1)$$

$$T_d^B(n) = \sum_{i \in k_d(n)} RC_d^B(i) \times TTI_d^B(i)$$

where $RC_u^A(i)$ and $RC_d^B(i)$ are defined as channel instantaneous data rate (IDR), which is the number of bits in one transmission interval divided by transmission time interval (TTI) for current transmission over the channel. $TTI_u^A(i)$ and $TTI_d^B(i)$ may represent TTI for uplink and downlink channels respectively, and $k_u(n)$ and $k_d(n)$ are indices of those intervals for encoding a current video frame.

Tokens may be inserted to the uplink token bucket (e.g., $LB_u^A(n)$ unit 26) as follows:

$$LB_u^A(n) = \min(LB_{max,u}^A, LB_u^A(n-1) + T_u^A(n) + LB_{local,u}^A) \quad (2)$$

where, $LB_{max,u}^A$ is the maximum uplink buffer size, and $LB_{local,u}^A$ A is local token factor controlled by $\alpha_u(<1)$ of the uplink buffer, which is defined as follows:

$$LB_{local,u}^A = \alpha_u \times (LB_{max,u}^A - LB_u^A(n-1)) \quad (3)$$

Similarly, tokens are inserted to the downlink bucket (e.g., $LB_d^B(n)$ unit 28) as follows:

$$LB_d^B(n) = \min(LB_{max,d}^B, LB_d^B(n-1) + T_d^B(n) + LB_{local,d}^B) \quad (4)$$

where $LB_{max,d}^B$ is the maximum downlink buffer size, and $LB_{local,d}^B$ is local token factor controlled by $\alpha_d(<1)$ of the downlink buffer which is defined as follows.

$$LB_{local,d}^B = \alpha_d \times (LB_{max,d}^B - LB_d^B(n-1)) \quad (5)$$

According to equations 3 and 5, additional tokens may be added to the buckets, based on LB_max (a predetermined constant), current token bucket occupancy and alpha ($\alpha$). The alpha ($\alpha$) may be a constant, or may be a function of the elapsed duration since last successful encoding opportunity. The alpha ($\alpha$) may be used to determine how to come out of a situation of congestion.

When a video frame is encoded and delivered to the lower layers at time n, the following steps may taken by UA 112 to remove tokens from token buckets.

$$LB_u^A(n+1) = LB_u^A(n) - RS^A(n)$$

$$LB_d^B(n+1) = LB_d^B(n) - RS^A(n) \quad (6)$$

where $RS^A(n)$ is the size of the encoded video frame at time n. Note that $RS^A(n)$ is also the instantaneous data rate (IDR) of the source encoder at time n, and can be used to estimate source average data rate (ADR) for a given duration $n_1$ to $n_2$.

Accordingly, the described token bucket algorithm may be used to monitor varying uplink and downlink throughput.

TMN8 proposes rate control for low-delay video communications by utilizing a traffic shaping buffer occupancy. In this disclosure, instead of utilizing the traffic shaping buffer occupancy, the encoding device may use occupancies of uplink/downlink token buckets. For this, TMN8 is targeted for nominal average data rate such as 64 kbps. At every encoding opportunity (e.g. 100 ms for a 10 frames per second video) the video frame size $RS^A(n)$ may be estimated by the rate decision algorithm described herein. The video frame may only be encoded and transmitted when the following condition is satisfied.

$$RS^A(n) \leq \min(LB_u^A(n), LB_d^B(n)) \quad (7)$$

If the frame is encoded and transmitted, then the token buckets are updated. Otherwise, the frame is skipped, and the saved budget is available for encoding at a subsequent encoding opportunity. As described in this disclosure, however, the encoding opportunities may be defined more often than scheduled following a frame skip. For example, $RS^A(n)$ may be estimated every 2 ms following a frame skip so that the skipped frame can possibly be constructed sometime near the time it was scheduled to be constructed once throughput is sufficient.

In general, this disclosure describes a feedback based network adaptive source coding apparatus and method for packet switched multimedia telephony applications, specifically for multimedia streams, such as that carrying video and audio data. The algorithm used in the method is generic for various CODECs and different access technologies. The algorithm is configured to adapt to the source coding behavior to the network conditions of (i) packet losses and (ii) varying throughput.

Generally stated, the methodology of the algorithm involves rate decision based on (a) function of observed uplink throughput, (b) function of observed downlink throughput (c) input source variability as compared to previously encoded and transmitted data, (d) desired compression quality, and (e) average target source rate. However, not all the five functions/criteria (a)-(e) are necessarily needed. Further, this approach enables variable frame rate encoding. The video quality is regulated using elapsed duration and changing source characteristics.

In following discussion of this disclosure, various abbreviations are used as defined below:
VBR—variable bit rate
PS VT—packet switched video telephony
CADR—channel average data rate
HSPA—High Speed Packet Access
HRPD—High Rate Packet Data
3G—third generation
IDR—instantaneous data rate
RC—rate of channel (i.e., instantaneous data rate of a given channel)
RS—rate of source (i.e., instantaneous data rate of a given source)
ADR—average data rate
UE—user equipment
PDSN—packet data serving node
ADR—average data rate
QoS—quality of service
VCEG—Video Codecs Experts Group, ITU-T SG16 WP3 Q.6
IETF—Internet Engineering Task Force
RFC—Request for Comments
RTP—Real-Time Transport Protocol 3GPP—Third Generation Partnership Project
DL—downlink
UL—uplink
TTI—time to transmit interval There may be benefits to matching source rate with channel rate in packet switched communications. The benefits may include lower end-to-end delay, increased statistical multiplexing gain (SMG), and so forth. Feedback based VBR (F-VBR) may achieve better performance than shaped VBR (S-VBR) and constrained VBR (C-VBR).

Packet Switched Telephony Communications via wireless media pose special challenges. Wireless channels may be susceptible to packet losses and a design for a codec (encoder-decoder) needs to provide adequate error resiliency against such losses. Heretofore, many error resiliency solutions have been that of encoder assisted (e.g. regular Intra-refresh, adaptive Intra-refresh, etc.) and may impact rate control aspects of the video codecs used in PS VT.

As channel resources and packet loss characteristics can vary for wireless channels such as HSPA and HRPD, it is beneficial to monitor the channel and use feedback based rate adaptation for PS VT.

This disclosure describes algorithms that utilize feedback messages for optimal rate control. Feedback signals and signaling mechanisms for packet switched video telephony in 3G shared channels such as HSPA and HRPD may be identified.

Prior to further description of examples of this disclosure, some mathematical terms and notations are defined below.

Instantaneous Date Rate (IDR): $R_y^x(k)$. The amount of bits delivered in the smallest possible unit of time in the system. Note that the instantaneous data rates for Channels and Sources typically are measured over different time units. For example, the instantaneous data rate of the video encoder may comprise the number of coded bits in a video frame, divided by the elapsed duration from the previous encoded video frame. Instantaneous data rate for a channel may comprise the number of bits in one TTI, divided by the TTI in seconds. In which:

superscript x=A or B for UE A or B, respectively;
subscript y=u or d for uplink or downlink channels, respectively;
index k=0. K-1 is the time instance at which the IDR is measured.

The label RS is used for source or video IDR and the label RC is used for channel IDR.

Source IDR $RS_y^x(n)$: The number of bits in one coded frame divided by $(TS_y^x(n)-TS_y^x(n-1))$,
where, source generation time instant $TS_y^x(n)$: time (in seconds) of currently encoded video frame, Initialization $TS_y^x(0)=0$ Channel IDR $RC_y^x(i)$: The number of bits in one transmission interval, divided by TTI(i),
where, $TTI(i)=(TC_y^x(i)-TC_y^x(i-1))$: transmission time interval (in seconds) for current transmission over the channel; and channel transmission time instant $TC_y^x(i)$: time (in seconds) at which current transmission over channel starts.

Source Average Data Rate ($S_{ADR}$):

$$S_{ADR}(M, m) = \frac{1}{(TS(M) - TS(m))} \sum_{k=m}^{M} RS(k) * (TS(k) - TS(k-1)),$$

where TS(M)−TS(m) is the duration of observation.

Channel Average Data Rate ($C_{ADR}$):

$$C_{ADR}(M, m) = \frac{1}{(TC(M) - TC(m))} \sum_{k=m}^{M} RC(k) * (TTI(k)),$$

where TC(M)−TC(m) is the duration of observation.

ADR is typically the average rate observed over a predefined duration of time. The following durations may be used for calculation of video ADR:
Duration can be one GOP.
Duration can be the entire clip used for simulation or the entire duration of a session.
Duration can be a sliding window of a few seconds.
For 3GPP2 variable rate speech codecs the ADR is calculated over 12 sec durations.

The term Rate may be used to represent $S_{ADR}$ and $C_{ADR}$, in which case, the context may be used to disambiguate the term rate from $S_{ADR}$ and $C_{ADR}$.

Channel Throughput: $T(n,m)=C_{ADR}(n,m)*(TC(n)-TC(m))$. The duration of a TTI is typically much smaller than the video frame rate. The term throughput T(n) may be used to represent the number of bits delivered by the channel up to the time n from a start of a simulation. This can be used to determine the throughput during the interval between two coded packets generated by a source. E.g., channel throughput between source frames n and n−1, $$T(TS_y^x(n), TS_y^x(n-1)) = T(TS_y^x(n), m) - TC(TS_y^x(n-1), m)$$
$$= C_{ADR}(TS_y^x(n), m) * (TC(TS_y^x(n)) - TC(m)) -$$
$$C_{ADR}(TS_y^x(n-1), m) * (TC(TS_y^x(n-1)) -$$
$$TC(m))$$
$$= \sum_{k=ST_y^x(n-1)}^{ST_y^x(n)} RC(k) * TTI(k)$$

Constant Bit Rate Channel (CBR Channel): A channel for which $RC(i)=R \forall i$. Examples include DS0 in PSTN.

Variable Bit Rate Channel (VBR Channel): A channel for which RC(i) can be different over the sampled time intervals. Examples include HSPA and HRPD in 3G networks.

Constant Bit Rate Source (CBR Source): A source CODEC that generates constant IDR. $RS(n)=R \forall n$. Examples include G.711, G.722.1, etc.

Variable Bit Rate Source (VBR Source): A source CODEC that is capable of generating variable IDR over the sampled time intervals. Examples include 13K vocoder, EVRC family, H.263, etc.

Rate Control: A module or process to match the source ADR to the channel ADR over a specified time interval. The time interval will typically be longer than that used for IDR calculation. For a CBR source matched to a CBR channel, there is typically no need for rate control.

Figure 4:
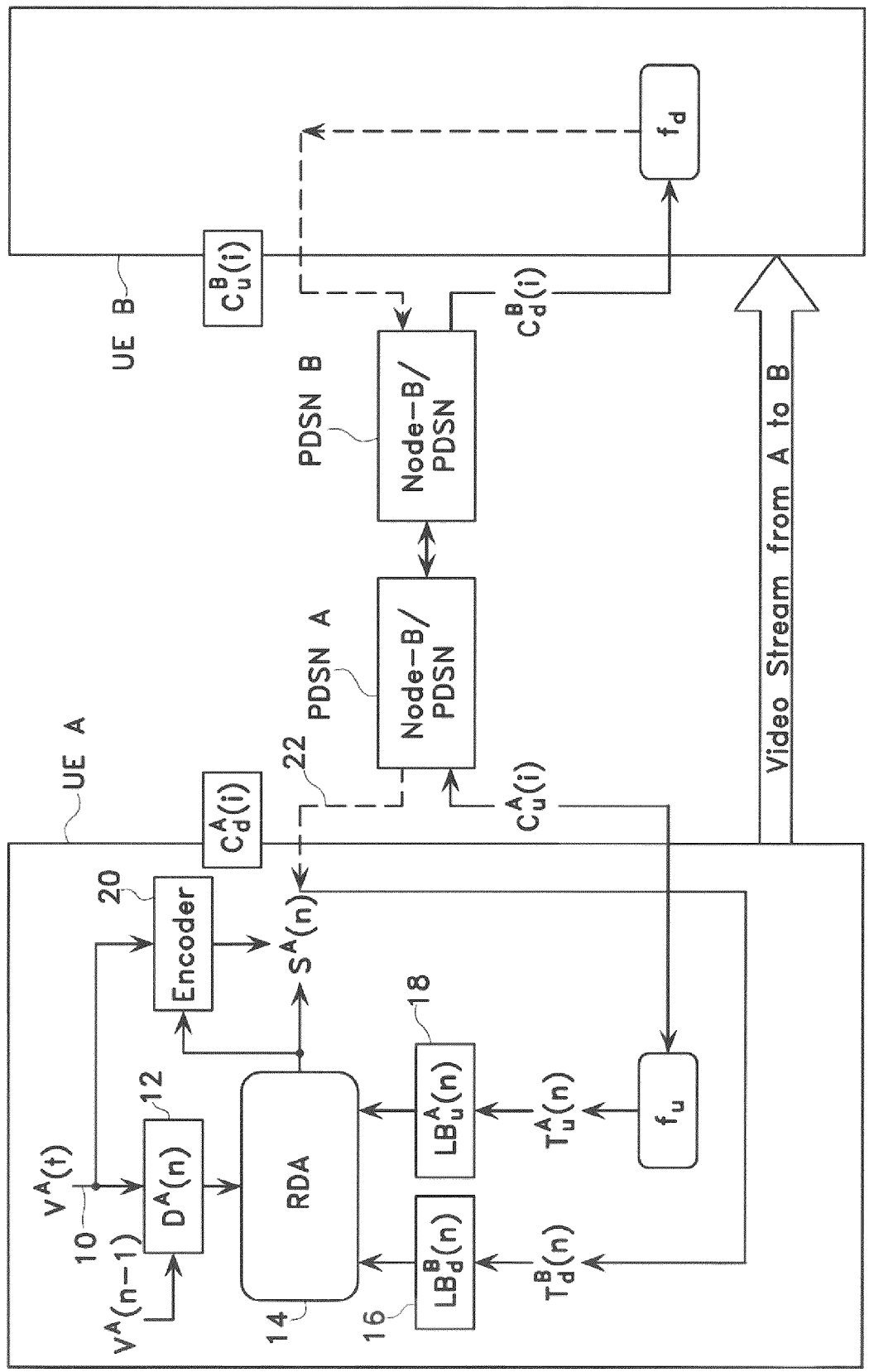
FIG. 4 is similar to FIG. 1 and schematically shows an example in the form of a functional diagram of a feedback based rate control system between user equipment.

Token Bucket $LB_y^x(n)$: A virtual buffer used in many rate control approaches. Token buckets are typically characterized by token arrival rate ρ bytes every $t_i$ seconds, packet delivery rate of σ bytes every $t_k$ seconds and a peak bucket size of β bytes. In FIG. 4, token buckets are shown as $LB_y^x(n)$, where x=A or B for UE A or B, respectively, and y=u or d for uplink or downlink channels, respectively. Further, token arrival rate σ and packet delivery rate ρ in FIG. 4 are functions of time index n. Token bucket may also be referred to herein token buffers.

Reference is now made to FIG. 4 which is similar to FIG. 1, and schematically shows an example in the form of a functional diagram of a feedback based rate control system between two UEs, UE A and UE B. The various functions as shown in FIG. 4 and described below can be implemented by circuitry well know in the art. For simplicity in explanation, the network functions associated with the UE A and UE B are not shown in FIG. 4 but merely represented by the PDSN A and PDSN B, respectively. In FIG. 4, the UE A is shown as the sender of a video stream and the UE B is shown as the receiver the stream.

Suppose baseband signals, such as video or audio signals, are fed into the input 10 of the estimator 12 that estimates the source characteristics. The estimation is performed to determine the distortion for the current video frame v(t) as compared to that of the prior frame v(n−1). This information is used by rate decision module 14 using a rate decision algorithm (RDA) along with the token information from the receiver for downlink properties/conditions 16 and the measurer for uplink properties/conditions 18 held in the token buckets $LB_u^A(n)$ and $LB_d^B(n)$, respectively. If the instantaneous data rate required for the current frame is less than the minimum of the tokens in token buckets $LB_u^A(n)$ and $LB_d^B(n)$, then the current frame is encoded by the encoder 20, else it is not encoded. The encoded signal is then sent to the PDSN A via a transmit circuit (See e.g., FIG. 6).

The uplink token bucket $LB_u^A(n)$ in the measurer for uplink properties/conditions 18 is updated (tokens added) based on a function of the channel throughput on the uplink, information at UE A and buffer occupancy. Similarly, the downlink token bucket $LB_d^B(n)$ in the receiver for downlink properties/conditions 16 is updated (tokens added) based on the channel throughput on the downlink and buffer occupancy. It should be noted that the use of token buckets LB as described above merely serves as an illustrative example. Other functions as inputs to the RDA can also be used.

There is a signal path feedback from UE B to UE A labeled 22 in FIG. 4, which signal path can assume various forms. The signal path 22 relays the downlink channel properties/conditions to the sender, such as the UE A. The signal path 22 can be a dedicated channel specifically allocated for such a purposes. Alternatively the signal path 22 need not be a dedicated channel but instead shared with any of the other channels. For example, information in the otherwise dedicated channel can be instead piggybacked onto other channel(s).

Figure 5:
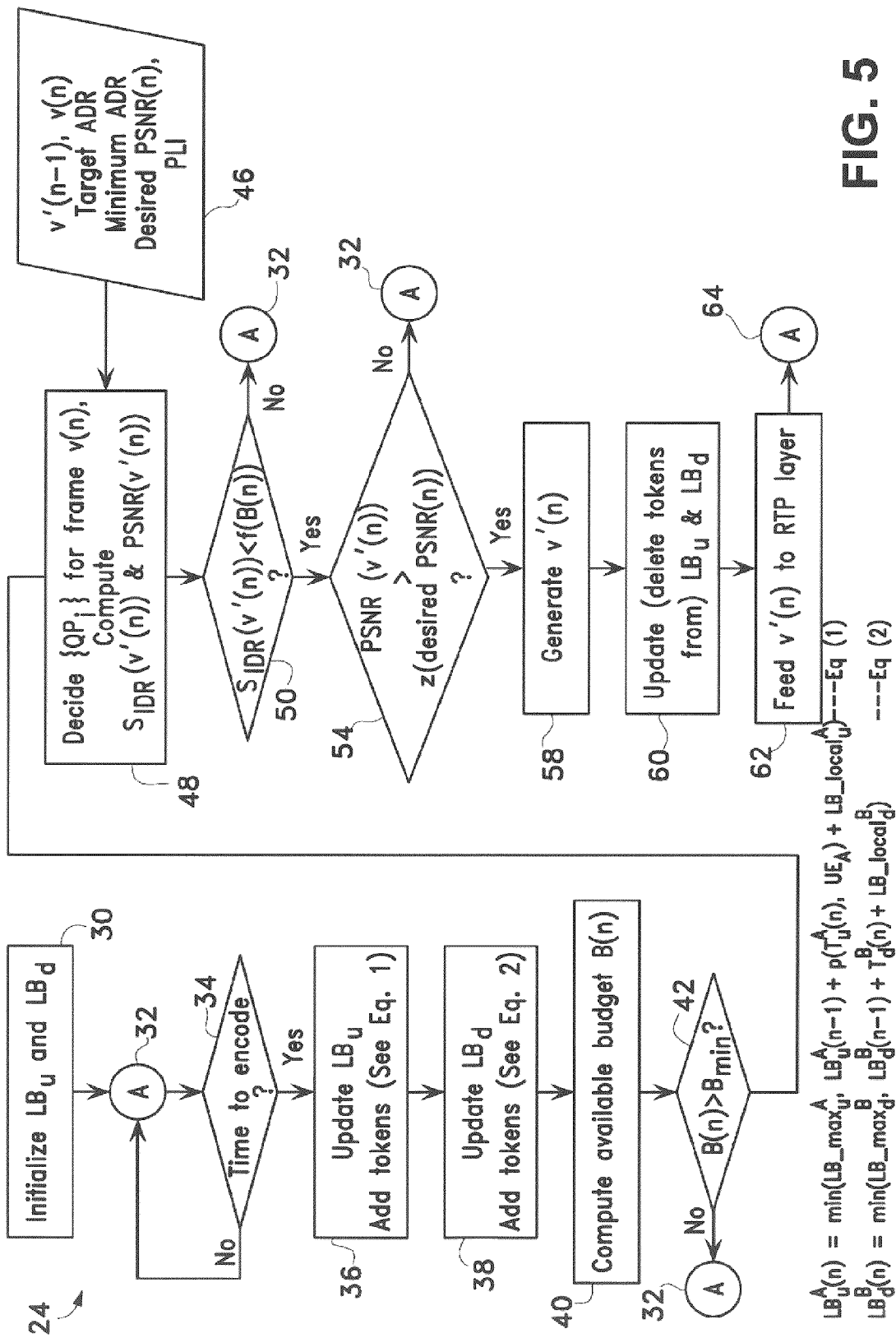
FIG. 5 is a flowchart illustrating operations of one example consistent with this disclosure.

FIG. 5 is a flowchart illustrating operations of an example consistent with this disclosure, and is generally signified by the reference numeral 24. It is assumed that the target source ADR is specified via some scheme such as QoS negotiation. The overall process 24 can be generally grouped for explanation below.

In relation to buffer updates, one aspect of this disclosure is to use two separate token buckets for tracking the uplink and downlink channel characteristics. Tokens are inserted into the token buckets as a function of the respective channel throughputs, and removed from the token buckets based on encoded frame sizes. Blocks 36 and 38 of process 24 in FIG. 5 represent the buffer update procedures. The buffer update step includes the sub-steps of inserting tokens to token buckets and removing tokens from token buckets.

For inserting tokens to token buckets, tokens are added to the token buckets $LB_u^A(n)$ and $LB_d^B(n)$ based on the throughput on the respective links, uplink and downlink. The throughput is the total channel throughput from the previous encoding time to the current time. Similarly, tokens are depleted from the token buckets after a successful encoding operation. Here, the uplink token bucket serves the function of mapping content dependent source encoding VBR plan to uplink VBR transmission plan. Similarly, the downlink token bucket serves the function of mapping content dependent source encoding VBR plan to downlink VBR plan. Such content dependent source encoding results in VBR patterns that need not be similar to available channel resources and the resulting transmission plans, at any given time. Finally, the encoding decision is based on the estimates of source budget and token bucket occupancies. These operations are illustrated in the following equations.

Note that $LB_u^A(n)$ in block 36 is updated based on the throughput on the uplink, local statistics at UE A and in addition tokens are leaked into the bucket ($LB\_local_u^A$). Similarly, $LB_d^B(n)$ in block 38 is updated based on the throughput on the downlink at UE B and in addition tokens are leaked into the bucket ($LB\_local_d^B$). The rate at which tokens are leaked to $LB_d^B(n)$ is a function of minimum ADR. Further, $LB\_local_d^B$ is a function of re-pointing duration (during hand offs to a different cell), so that downlink throughput is not over compensated during hand offs. Further, if downlink feedback is not received after a certain duration after handoff, it can be assumed that video can not be sustained in the new cell. In such situations, it is possible to drop video, resulting in outage $$LB\_max_u^A = \text{maximum uplink buffer size} \quad -\text{Eq (1)}$$
$$LB\_max_d^B = \text{maximum downlink buffer size}$$
$$LB\_local_u^A = (LB\_max_u^A - LB_u^A(n-1)) * f(t_u)$$
$$t_u = \text{curr\_time} - TS^A(n-1)$$
$$LB_u^A(n) =$$
$$\quad \min(LB\_max_u^A, LB_u^A(n-1) + p(T_u^A(n), UE_A) + LB\_local_u^A)$$

$$UE_A : \text{Local information at } UEA \quad -\text{Eq (2)}$$
$$LB\_local_d^B = (LB\_max_d^B - LB_d^B(n-1)) * g(t_d)$$
$$t_d = \text{curr\_time} - TS^A(n-1)$$
$$LB_d^B(n) = \min(LB\_max_d^B, LB_d^B(n-1) + T_d^B(n) + LB\_local_d^B)$$

$$T_u^A(n) = \sum_{i=n-1}^{n} RC_u^A(i) * TTI_u^A(i)$$

$$T_d^B(n) = \sum_{i=n-1}^{n} RC_d^B(i) * TTI_d^B(i)$$

In the above equations f( ), g( ) and p( ) are some generic functions. Further, f( ) and g( ) may be a predetermined constants alpha_d and alpha_u ($\alpha_d$ and $\alpha_u$) described herein. It is assumed that that the throughput $T_d^B(n)$ for a given observation window is computed by module $f_d$ at UE B and delivered to UE A by a "Genie." The "Genie" may comprise a new bitstream syntax for a given video decoder or new RFC payload definition for a given video bitstream or a generic mechanism to piggyback feedback information with existing RTP payload definitions. In addition, the "Genie" can be a dedicated logical channel to carry the feedback information.

As for the sub-step of removing tokens from the token buckets in block 60, if a video frame is encoded and delivered to lower layers at time=n, the following steps are taken to update the buffers.

$$LB_u^A(n+1) = LB_u^A(n) - S^A(n)$$

$$LB_d^B(n+1) = LB_d^B(n) - S^A(n)$$

In relation to error mitigation, when a sender receives a packet loss indication by feedback, the sender increases error resiliency of the current frame to reduce the error propagation incurred by the receiver. The error resiliency can be improved by several techniques such as using Intra frame/slice, increasing the percentage of Intra macro-blocks, or Intra macro-block coding of the macro-blocks affected by the signaled loss. Blocks 48 of the process 24 in FIG. 5 represent the error mitigation procedure.

In relation to a rate decision algorithm, blocks 32, 42, 46, 48, 50 and 54 of the process 24 in FIG. 5 represent exemplary rate decision steps. For a current frame v(t), motion estimation (ME) is performed, then ME metrics e.g., sum of absolute differences (SAD) or sum of squared differences (SSD) are collected in block 48. Using these collected metrics and the packet loss indication in block 46, a rate control algorithm in block 48 selects QPs (frame QP or slice QP, and $\Delta(QP)$) and modes (intra or inter) for each macroblock to result in minimum distortion $D^A(n)$ under the constraint in block 50.

$S_{estimate}^A(n) \leq B(n) = \min(LB_u^A(n), LB_d^A(n))$, where $S_{estimate}^A(n)$ is the estimated source IDR from the rate control module. Let $S^A(n)$ be the actual source IDR after encoding. If $S^A(n) \leq B(n) + R_{margin}$ in block 50, and $D^A(n) - D^A(n-1) < z(D^A(n-1), TS^A(n) - TS^A(n-1), mv(n))$ in block 54, then, V(n) is encoded in block 58 and $LB_u^A(n)$, $LB_d^A(n)$ are correspondingly updated in block 60. Note that the resulting $S^A(n)$ also should meet a condition which is set by the target source ADR in block 46. Otherwise, V(n) is not encoded in block 32.

One useful aspect of the above approach is that the encoding decision is based on $D^A(n) - D^A(n-1) < z(D^A(n-1), TS^A(n) - TS^A(n-1), mv(n))$ in block 54. Here z( ) corresponds to a degradation tolerance, which is a function of previously encoded quality, temporal distance between the current frame and the previously encoded frame, and motion vectors. This function determines how much degradation can be tolerated when encoding the current frame, and if degradation satisfies the tolerance, then the frame is encoded, otherwise it is not. An encoding device may use higher tolerance when the frames contain static motions, and smaller tolerance when the frames contain high motion contents to address the fact that human visual system (HVS) is less sensitive to frame quality for fast motion scenes, while it is more sensitive to frame quality for static scenes. Note that mv(n) is normalized by $TS^A(n) - TS^A(n-1)$ to compute the tolerance. An example of z( ) can be $z(.) = \gamma D^A(n-1)$. As an example, if less than $\alpha$ dB degradation is allowed between consecutive frames, then $\gamma = e^{\alpha/10} - 1$. This example can be further extended for high motion content e.g., for high mv(n) over a short observation window (small $TS^A(n) - TS^A(n-1)$) by using a larger value of $\gamma$.

Figure 6:
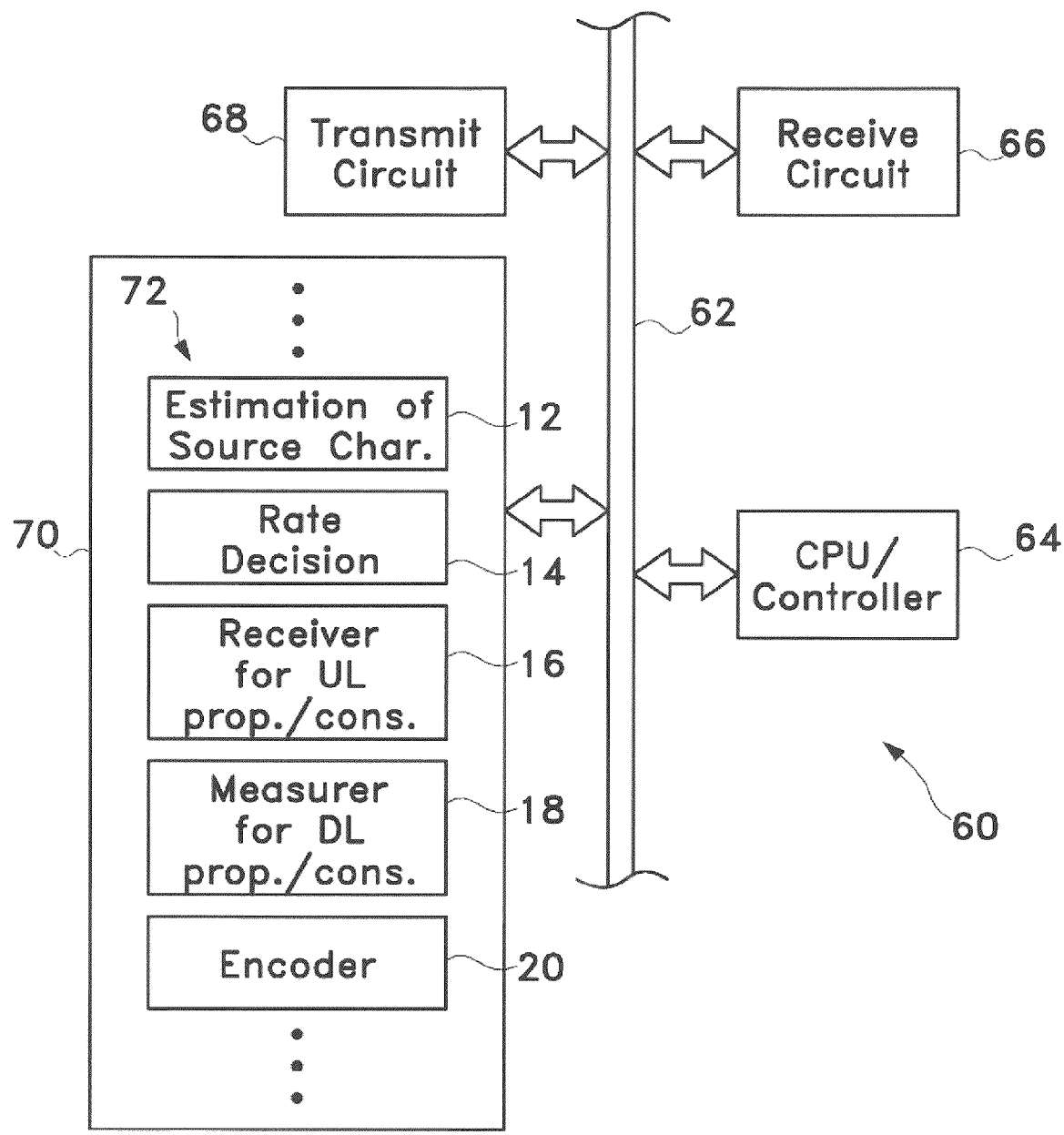
FIG. 6 schematically shows an exemplary hardware implementation of an apparatus, such as that for the UE A or UE B as shown in FIG. 1.

FIG. 6 schematically shows an exemplary hardware implementation of an apparatus, such as that for the UE A or UE B as shown in FIG. 1, signified by the reference numeral 60. Apparatus 60 can be built and incorporated in various forms, such as a wireless radiotelephone, a landline digital telephony device, a laptop computer, or a personal digital assistant (PDA), to name a few. It needs to be emphasized that the techniques of this disclosure are not necessarily restricted to be used in a wireless environment.

Apparatus 60 may comprise a central data bus 62 linking several circuits together. The circuits include a CPU (Central Processing Unit) or a controller 64, a receive circuit 66, a transmit circuit 68, and a memory unit 70. If the apparatus 60 is part of a wireless device, the receive and transmit circuits 66 and 68 can be connected to a RF (Radio Frequency) circuit, but this RF circuit is not shown in FIG. 6 for simplicity and ease of illustration. Receive circuit 66 processes and buffers received signals before sending the signals over data bus 62. On the other hand, the transmit circuit 68 processes and buffers the data from the data bus 62 before sending data from device 60. The CPU/controller 64 performs the function of data management of the data bus 62 and further the function of general data processing, including executing the instructional contents of the memory unit 60.

Instead of being separate components, as shown in FIG. 6, as an alternative, the transmit circuit 68 and the receive circuit 66 may be parts of the CPU/controller 64. Memory unit 70 includes a set of instructions generally signified by the reference numeral 72. In this case, the instructions include, among other things, an estimator of source characteristics 12, a rate decision module 14, a receiver for downlink properties/conditions 16, a measurer for uplink properties/conditions 18, and an encoder 20. The various functions of modules 12, 14, 16, 18 and 20 have been described and generally shown in FIG. 4.

In this example, memory unit 70 may comprise a random access memory (RAM) circuit. The exemplary modules 12, 14, 16, 18 and 20 may comprise software routines and/or data sets. Memory unit 70 can be tied to another memory circuit (not shown) which can either be of the volatile or nonvolatile type. As an alternative, the memory unit 50 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the structure and techniques described and generally shown in FIGS. 4 and 5 may also be coded as computer-readable instructions carried on any computer-readable medium known in the art. In this specification, the term "computer-readable medium" refers to any medium that participates in providing instructions to any processor, such as the CPU/controller 64 shown and described in FIG. 6, for execution. Such a medium can be of the storage type and may take the form of a volatile or non-volatile storage medium as also described previously, for example, in the description of the memory unit 70 in FIG. 6. Such a medium can also be of the transmission type and may include a coaxial cable, a copper wire, an optical cable, and the air interface carrying acoustic, electromagnetic or optical waves capable of carrying signals readable by machines or computers. In this disclosure, signal-carrying waves, unless specifically identified, are collectively called medium waves which include optical, electromagnetic, and acoustic waves. A computer program product refers to a tangible physical medium that includes a computer-readable medium, which may be used to sell or distribute software instructions that execute the techniques of this disclosure. The computer program product may include packaging materials.

Encoder 20 may adjust the source IDR to match the channel throughputs, be it for the uplink channel or the downlink channel or both. The techniques of this disclosure also allow an encoder to utilize variable frame encoding, and may allow freeze frame in the limiting case, such as when throughput is zero, as is often the case when handoff is carried out in a congested cell. There is no scheduler specific information need to practice the techniques of this disclosure. That is, the described techniques are intended to work with any proprietary schedulers.

At least some of the features of above disclosure can be summarized as follows. The rate decision algorithm is based on (a) function of observed uplink throughput, (b) function of observed downlink throughput, (c) input source variability, compared with previously encoded and transmitted data, (d) desired compression quality, and (e) a specified ADR. The proposed solution performs variable frame rate encoding, wherein the output frame rate is a function of (a) observed uplink throughput, (b) observed downlink throughput (c) input source variability, compared with previously encoded and transmitted data and (d) desired compression quality.

The proposed solution regulates encoded quality as a function of (a) previously encoded frame quality, (b) temporal distance between previously encoded frame and current time, and (c) changing source characteristics. The proposed solution tracks the uplink and downlink channel characteristics using two separate token buckets. Each of the token buckets is updated using a function of the respective throughputs, the maximum bucket sizes and the current bucket occupancies. The downlink token bucket is further leaked with tokens using a function of minimum average data rate and hand off duration during loading conditions and handoffs.

Figure 7:
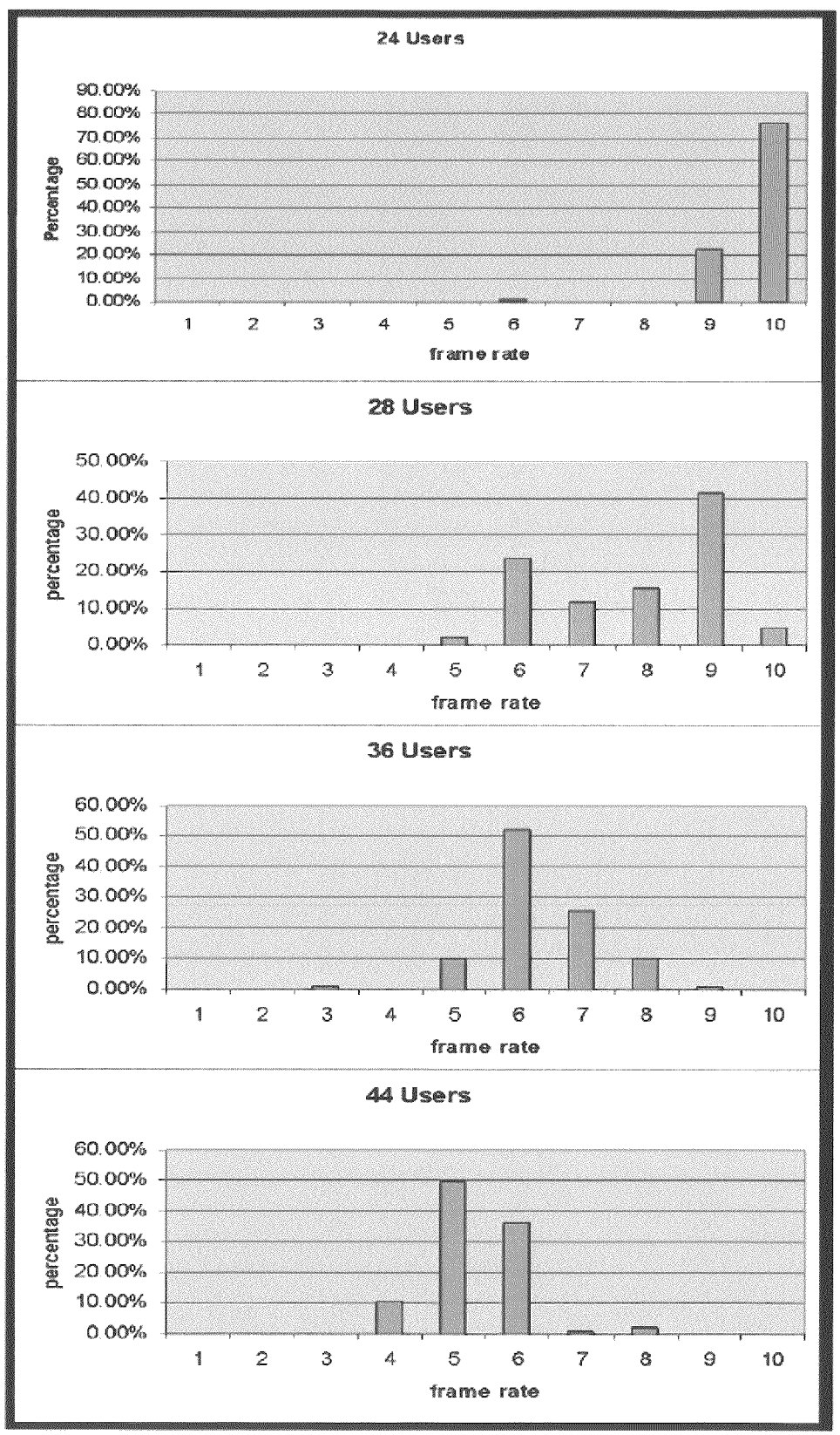
FIG. 7 illustrates four frame rate histograms of frame rates of devices in systems with 24, 28, 36 and 44 users, respectively.

FIG. 7 illustrates four frame rate histograms for different systems with 24, 28, 36 and 44 users, respectively. FIG. 7 illustrates that as the number of users increases, the rate control algorithm described herein skips more frames, which demonstrates an ability to gracefully trade-off between user experience and number of users in the system.

Determining system level performance of such a network requires event-driven, dynamic system simulation tools capable of simulating multiple users and multiple cells, to accurately model feedback loops, signal latency, site selection, protocol execution, random packet arrival, and mobility in a multipath fading environment, etc. For simulations, one can follow the assumptions summarized as follows:

a) slots per second is 1500, and chips per second is 3840000,
b) number of base stations is 19, sectors per base station is 3, and number of users per sector is between 24 and 52 in the center cell,
c) cell radius is 1620 meters,
d) antenna model is 2, and channel model is Pedestrian A (3 km/h), and
e) proportional fair scheduler is used.

Consistent with the techniques of this disclosure, land-to-mobile call scenarios were simulated, in order to study the effect of scheduler in Node-B due to system loading. This was accomplished this by adding constant size tokens at regular intervals to the uplink token bucket $LB_u^A$ and simulating a CBR channel for the wireline uplink. For the specified QoS of 64 kbps channel, this results 800 bytes every 100 ms.

Typically, a data traffic model is needed to capture the interaction between radio link algorithms/designs and end-user applications. Best effort models characterize web browsing and other applications over TCP/IP. They provide a closeloop traffic model with variable size IP packets depending on the quality of the radio link and the policies of the radio network's packet scheduler. Real-time models combine packet loss requirements and delay guarantees to test the capability of the air interface. The ability of the air-interface to meet these guarantees can be measured by both the probability of blocking and the residual capacity remaining for best effort services.

In order to overcome the difficulties of building a video traffic model, simulations implemented H.263+ Video codec in the above event driven, multi-user, multi-cell simulation platform. The specific settings used in this simulation were as follows:

a) video codec employed is H.263+ (Annexes I, J, K, T) with TMN8 rate control modified to use the proposed feedback, and adaptive intra macroblock refresh based on packet loss feedback from a receiver,
b) target bitrate was set to 64 kbps, and no GOP structure was used for encoding,
c) input source was Foreman QCIF sequence with a nominal frame rate 10 fps, and the call duration was 30 seconds, and
d) a virtual channel was used to carry feedback from UE B to UE A. The virtual channel delays feedback information to a set value, in order to evaluate the benefits of timely feedback.

Average Peak Signal-to-Noise Ratio (PSNR) does not correlate well with perceptual quality of reconstructed video sequences. This is particularly exacerbated in error prone environments, where due to the predictive nature of video encoding, a single packet error typically results in PSNR degradation in multiple video frames (error propagation). Hence, it would be beneficial to "objectively" capture the effects packet losses have on decoded video quality. In order to capture this error propagation effect a new objective metric percentage degraded video duration (pDVD) may be used. pDVD indicates the percentage of the video sequence duration which was corrupted due to packet losses, i.e., the PSNR of the frame was significantly degraded when compared to the PSNR of the clean encoded frame.

pDVD can be defined as, $$pDVD(x) = \left(\sum_n 1((PSNR_n^c - PSNR_n^e) > x)\right) / N \qquad (8)$$

where, $PSNR_n^c$ and $PSNR_n^e$ are the PSNR of the nth frame under error-free and error-prone conditions, respectively, $1(y)$ is 1 if y is true and 0 otherwise, x is a predefined threshold, and N is the number of frames in the video sequence. One of the goals of the PSVT service should be to minimize pDVD, while maximizing PSNR.

Figure 8:
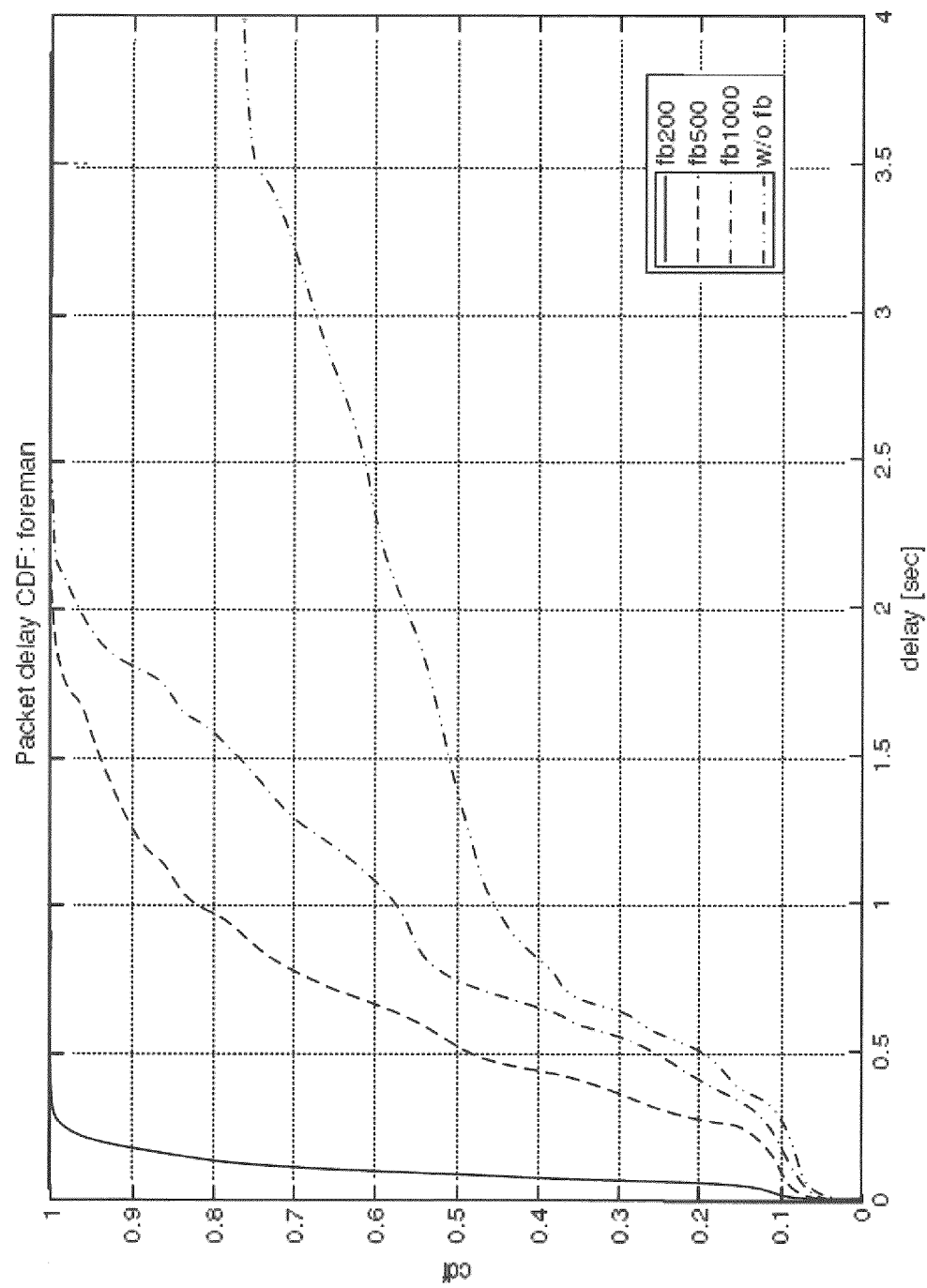
FIGS. 8 and 9 are graphs illustrating results of simulations to illustrate effectiveness of the techniques of this disclosure.

To demonstrate one advantage of the rate adaptation algorithm, one can compare the CDF of the logged packet delays with and without feedback. This comparison is shown in FIG. 8. When no feedback is used, more than 40% of the packets have an end to end delay greater than 2 seconds. However, when feedback is used, the delay for 90% of the packets is around 1.8, 1.25 and 0.18 seconds for feedback time constants of 1000, 500 and 200 ms, respectively. This significant reduction in packet delay clearly illustrates advantages of the techniques of this disclosure. Furthermore, from FIG. 8, it is clear that improved performance is possible by using faster feedback. E.g., when the feedback constant is 200 ms the maximum packet delay is around 350 ms. In FIG. 8, the condition without feedback was simulated by adding constant size tokens at regular intervals to the downlink token bucket $LB_d^B$. As the feedback time is reduced, the observed packet delay is reduced, which suggests the need for timely feedback to throttle encoder rate to match channel conditions.

For the specified QoS of 64 kbps channel, this results 16 bytes every 2 ms. As more users enter the cell, the bandwidth available for each user is reduced as mentioned before. In order to support reasonable video quality in this reduced available bandwidth the encoder has to skip encoding some of the frames.

FIG. 7 shows the variation in the encoded frame rate as the number of users in the system increases. The four plots in FIG. 7 indicate the frame rate histogram for 24, 28, 36 and 44 users. It can be observed that the described system demonstrates the ability to gracefully trade-off between user experience and number of users in the system by reducing the average frame rate as more users enter the cell.

Figure 9:
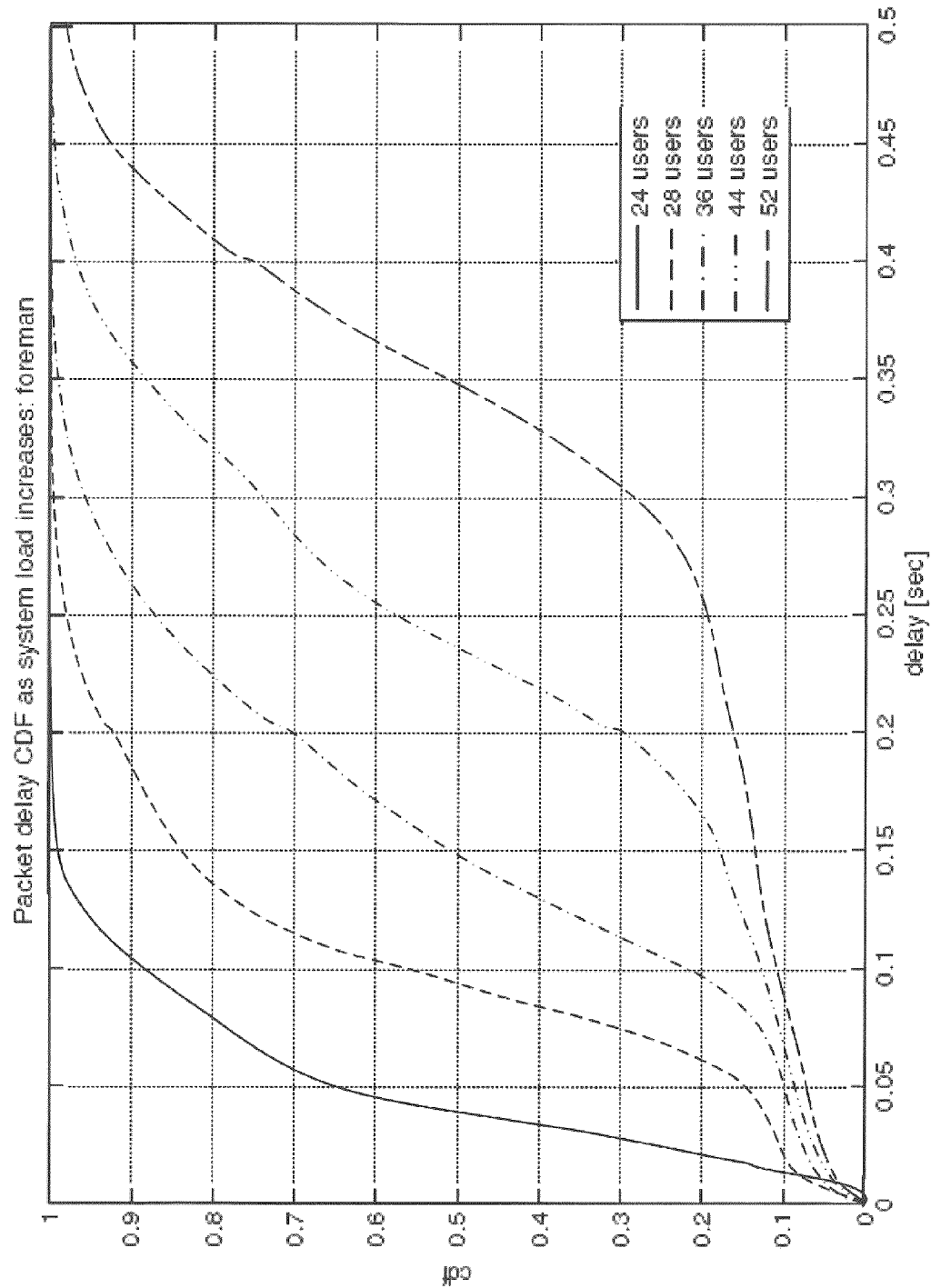

FIG. 9 illustrates the packet delay CDF when different number of users are present in the cell. For the case when there are 24 users in the cell, it can be observed that the maximum packet delay is around 170 ms, and the 90th percentile point of the packet CDF is around 100 ms. By ensuring that the end to end delay is kept to a low value, it can be expected that the video delay will have minimal effect on the user experience in a conversational application. Even when the number of the users is increased, it is desirable that the packet delay values do not increase dramatically to make the service unusable. From FIG. 9, it can be observed that even with 44 users the 90th percentile point of the packet CDF is around 350 ms which is still an acceptable value for a conversational service.

Notably, in FIG. 9, 3GPP has specified $95^{th}$ percentile point of 340 ms as a one way end-to-end transfer delay for video services. Objective metrics of PSNR and pDVD are shown for two typical users in Table I, below. The pDVD threshold x (see Equation 8) for declaring a frame as degraded was set to 2 dB. It can be observed that with a feedback time constant of 200 ms all packets are received in time for playback (as indicated by a pDVD value of 0). Notice that the clean PSNR value is lower for the case of feedback delay of 200 ms when compared to the "no feedback" case. This is due to the encoder reducing the bits allocated when channel conditions degrade. However, the advantage of the scheme is clearly demonstrated by comparing the lossy PSNR values. This demonstrates that when timely feedback is made available to the sender about the channel conditions, the encoder can adapt its transmission to ensure that packets do not get excessively delayed and thus the video quality at the receiver can be significantly improved.

Advantages of the described techniques can also be observed from Table I, below, which shows that the users consume more system resources (e.g. total bitrate) when feedback is not timely or not available at all. Yet, these additional resources do not translate into better user experience, as evidenced by high pDVD values and low PSNR at the receiver.

TABLE 1

| User number | feedback delay | bitrate (kbps) | PSNR (clean) | PSNR (lossy) | pDVD (%) |
|---|---|---|---|---|---|
| 1 | 200 | 52.05 | 33.24 | 33.24 | 0 |
| 1 | 500 | 58.11 | 33.29 | 18.26 | 79.5 |
| 1 | no feedback | 64.02 | 33.36 | 16.9 | 88.7 |
| 2 | 200 | 52.58 | 33.31 | 33.31 | 0 |
| 2 | 500 | 62.84 | 33.36 | 32.98 | 10.9 |
| 2 | no feedback | 64.02 | 33.36 | 23.93 | 57.3 |

Generally, Table 1 provides objective metrics achieved for two users for different feedback time constants. It can be observed that for a feedback time constant of 200 ms all packets are received in time for playback. It can also be seen that additional use of system resources (e.g. increased bitrate) will not translate to improved user experience, when timely feedback is not available.

The following discussion addresses some options for sending the feedback information from UE-B to UE-A. Traditional methods such as RTCP and RTCP APP packets, can be used to feedback observed throughput information. In addition, approaches such as RTP header extensions, can also be utilized for delivering feedback information efficiently. Many other design choices are possible, but the examples above can illustrate pros and cons of feedback channel design choices. In all of these options, existing implementations can ignore the feedback information and provide backward compatibility.

If one assumes a maximum bitrate of 128 kbps (H.263 Profile 3 Level 45, MPEG-4 Simple Profile Level 1b, H.264 Baseline Profile Level 1b), a two octet field is more than adequate to convey the observed throughput in octets. If feedback information is sent every 200 ms, the feedback message requires a bandwidth of 80 bps. Depending on the feedback mechanism used, there may be an additional overhead. For traditional RTCP and RTCP APP packets, this overhead can be as high as 90-120 octets per message, resulting in a bandwidth of up to 4800 bps.

Using non-compound RTCP APP Packets, the minimum APP packet size is 16 octets, including the 2 octets for observed throughput information. This results in a bandwidth requirement of 640 bps. With RTP header extensions, 8 octets are adequate to convey the feedback information within the RTP payload stream, resulting in a bandwidth of 320 bps. Notably, feedback information can be incorporated in the RTP stream only for bi-directional services such as PSVT.

In some packet switched services, it is possible to turn off RTCP. Further, RTP might be more reliable than RTCP when the users are at the cell edge conditions. This suggests the use of non-RTCP based mechanisms may be desirable when fast feedback is needed. Typically, RTCP messages in RTP/AVP profile are sent once every 5 seconds. With RTP/AVPF profile, RTCP messages can be delivered more frequently. If one assumes a typical 5% bandwidth of RTP bandwidth for RTCP, RTP/AVPF profile still has the limitations of RTP/AVP for the purposes of sending feedback in a timely manner and realize the benefits described herein. A solution for this is RTP/AVPF profile along with non-compound RTCP APP packets.

As the overhead is smaller with non-compound RTCP APP packets, it may be possible to fulfill the need for timely feedback to the sender. With RTP header extensions, it is notable that that the feedback information is delivered in a timely manner and could be more reliable than RTCP based approach.

The described rate adaptation techniques of this disclosure may take into consideration (i) packet losses, (ii) varying channel throughput and (iii) video source characteristics, while encoding a video source. To demonstrate the benefits of the described techniques, system level simulation results were presented using realistic simulation conditions adopted in standards bodies. It was shown that by taking channel bandwidth considerations into account at the encoder, the transmission latency of video packets over wireless networks could be significantly reduced, thus ensuring improved user experience in PSVT services. The additional advantage of controlling the latency is a reduction in observed video packet jitter thus enabling improved audio/video synchronization. Furthermore, our proposed approach has the capability of providing graceful degradation as more PSVT users enter the system by implicitly reducing the encoding frame rate while maintaining consistent video frame quality.

Figure 10:
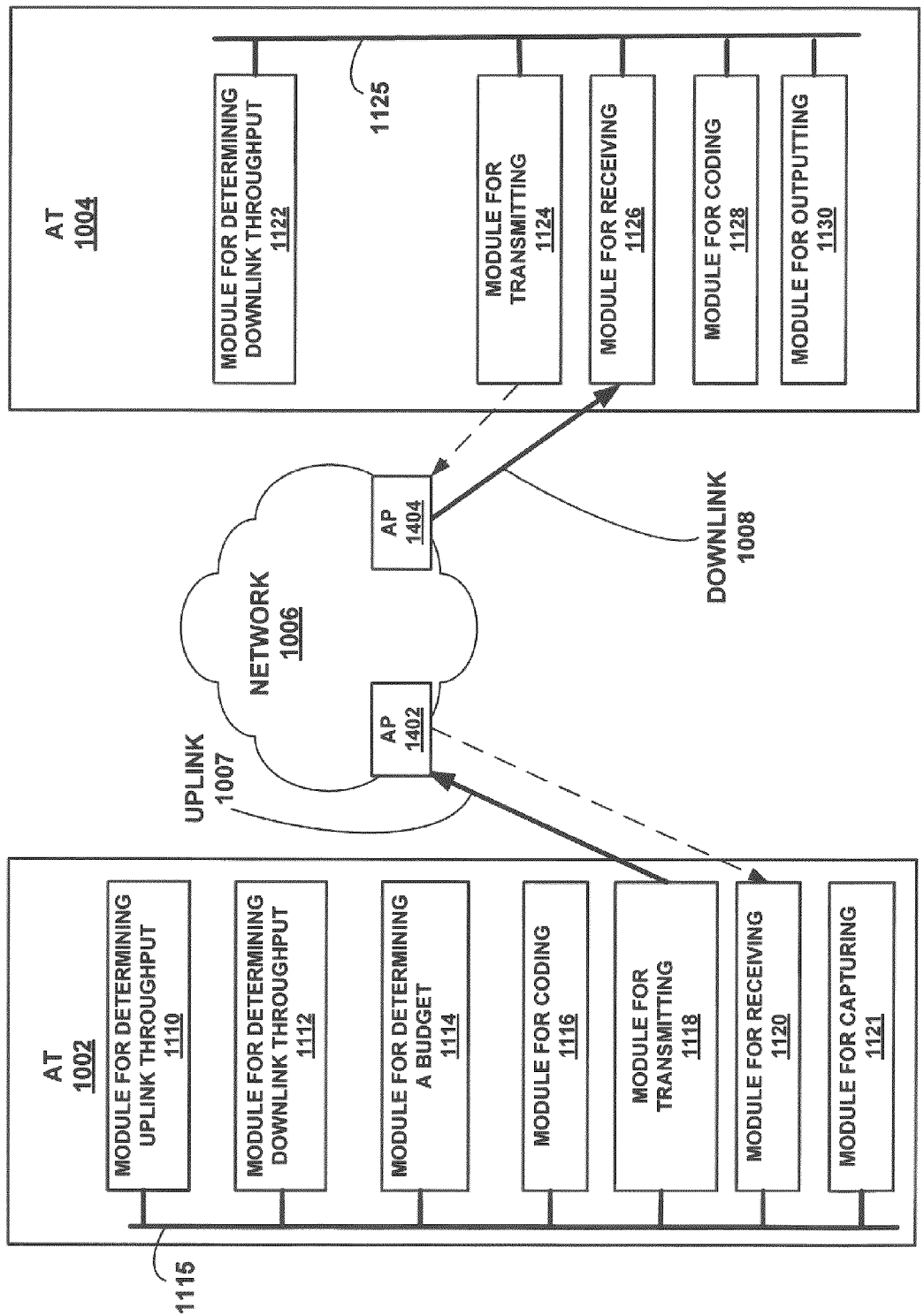
FIG. 10 is an exemplary block diagram illustrating one example system capable of implementing various techniques of this disclosure.

FIG. 10 is an exemplary block diagram illustrating one example system capable of implementing various techniques of this disclosure. In FIG. 10, access terminal (AT) 1002 and AT 1004 communicate with one another via network 1006. Network 1006 may include access points (APs) 1402 and 1404. AP 1402 receives data from AT 1002 via uplink 1007, and AP 1004 sends data from network 1006 to AT 1004 via downlink 1008. APs 1402 and 1404 may be communicatively coupled in network 1006, possibly though many routers and switches.

Although two ATs 1002 and 1004 are illustrated in FIG. 10, the techniques of this disclosure may be extended to support multimedia VT for any number of ATs. The components of AT 1002 are illustrated to demonstrate information capture, encoding and transmission, while the components of AT 1002 are illustrated to demonstrate information reception, decoding and display. ATs 1002 and 1004, however, may include reciprocal components to support two-way VT communication. That is, AT 1002 may include all of the components illustrated for device 1004 and vice versa. ATs 1002 and 1004 may comprise wireless communication devices, VT handsets, personal digital assistants (PDAs), laptop or desktop computers, or any type of device that includes VT functionality. In some cases, one of ATs 1002 and 1004 may comprise a non-wireless land-line terminal.

AT 1002 includes a module for determining uplink throughput 1110, a module for determining downlink throughput 1112, a module for determining a budget 1114, a module for coding 1116, a module for transmitting 1118, a module for receiving 1120 and a module for capturing 1121. All of these components, however, may not be needed to practice aspects of this disclosure. The different modules 1110, 1112, 1114, 1116, 1118, 1120 and 1121 may be communicatively coupled via a bus 1115, or various direct or indirect interfaces.

Module for determining uplink throughput 1110 and module for determining downlink throughput 1112 may comprise token buckets as described herein. Module for determining uplink throughput 1110 monitors throughput over uplink 1007, e.g., by adding tokens based on transmitted packet sizes over uplink 1007. Module for determining uplink throughput 1110 may implement a summation operation over an observation window of two successful encoding operations to sum the throughput over uplink 1007 during that observation window.

Module for determining down throughput 1112 monitors throughput over downlink 1008, e.g., by adding tokens based on transmitted packet sizes over downlink 1008 based on feedback from AT 1004. Module for determining downlink throughput 1112 may also implement a summation operation over an observation window of two successful encoding operations to sum the throughput over downlink 1008 during that observation window. Again, this downlink information is feed back from AT 1004 as described herein.

Module for determining the budget 1114 calculates the amount of data needed to code a given video unit (such as a video frame) at any given instance. Module for determining the budget 1114 may calculate this amount of data based on difference between current video frame relative to a previously coded frame. As more time elapses without coding a frame, the amount of data needed to code a frame typically increases due to added temporal distance of a current scene from the previously coded frame (hence, greater visual differences).

Module for coding 1116 may comprise an audio-video CODEC. Module for coding 1116 may code audio information seamlessly for communication to AT 1004, but may use the techniques of this disclosure to code video information selectively based on measured throughput of uplink 1007 and downlink 1008.

Module for transmitting 1118 may comprise a wireless or wire-based transmitter unit and module for receiving 1120 may comprise a wireless or wire-based receiver unit. In some cases, module for transmitting 1118 and module for receiving 1120 may comprise an integrated transceiver.

Module for capturing 1121 may comprise one or more units for capturing user input for VT. Module for capturing 1121 may include one or more audio capture units, such as a microphone to capture audio information, and one or more video capture units such as a camera unit to capture video information.

Network 1006 may comprise any network configuration, and in some examples may comprise the Internet. Network 1006 may also comprise any of a wide variety of public or proprietary networks. Network 1006 may include access nodes to facilitate communication to and from AT 1002 and to facilitate communication to and from AT 1004.

AT 1004 may include a module for determining downlink throughput 1122, a module for transmitting 1124, a module for receiving 1126, a module for coding 1128, and a module for outputting 1130. Module for determining downlink throughput 1122 may comprise token buckets as described herein. Module for determining downlink throughput 1122 monitors throughput over uplink 1008, e.g., by adding tokens based on received packet sizes over downlink 1008.

Module for transmitting 1118 may comprise a wireless or wire-based transmitter unit and module for receiving 1120 may comprise a wireless or wire-based receiver unit. In some cases, module for transmitting 1118 and module for receiving 1120 may comprise an integrated transceiver. Module for outputting 1130 may comprise one or more an output unit that output multimedia data to a user. For example module for outputting 1130 may comprise one or more speakers for audio output and one or more displays for video output.

According to this disclosure, module for determining uplink throughput 1110 determines a first level of throughput associated with multimedia data communication from AT 1002 to a first access node of network 1006 over uplink 1007. Module for determining downlink throughput 1112 determines a second level of throughput associated with multimedia data communication from a second access node of network 1006 to AT 1004 over downlink 1008 based on feedback from AT 1004 to AT 1002. Module for determining the budget 1114 determines a budget associated with communication of a video unit of the multimedia data. Module for coding 1116 codes the video unit based on the budget and the first and second levels of throughput.

If module for coding 1116 codes the video unit, then module for transmitting 1118 sends the coded video unit of the multimedia data from AT 1004 to AT 1002 via network 1006. As noted, modules 1112 and 1114 may comprise two separate token buckets at AT 1002, wherein a first token bucket stores information indicative of the first level of throughput and the second token bucket stores information indicative of the second level of throughput. Module for coding 1116 may code the video unit of the multimedia data with a size that is a function of the budget and occupancies of the first and second token buckets. The first token bucket may be updating to reflect the first level of throughput measured at AT 1002, and the second token bucket may be updated to reflect the second level of throughput measured at AT 1004, e.g., by module for determining downlink throughput 1122. Such updating of the token buckets may be based on negotiated quality of service (QoS) between ATs 1002 and 1004 for the VT session, current buffer occupancy of the first and second token buckets and elapsed time. Modules 1110 and 1112 may reduce contents the first and second token buckets when module for coding 1116 codes the video unit of multimedia data.

As noted, module for coding 1116 may code audio information associated with the video frame and module for transmitting 1118 may send the coded audio information from AT 1002 to AT 1004 over network 1006 regardless of whether the video frame is coded. In this way, multimedia VT may provide better guarantees and QoS for audio information, and such audio information may be given priority over video frames in bandwidth limited settings where either the uplink 1007 or the downlink 1008 has insufficient throughput for video but adequate throughput for audio.

Module for coding 1116 may skip coding of the video unit of multimedia data if the budget is greater than either the first level of throughput or the second level of throughput. In this case, upon skipping coding of the video unit of multimedia data, module 1110 may update the first level of throughput based on measurements at AT 1002, and module 1112 may updating the second level of throughput based on measurements at AT 1004, which are fed back to AT 1002. Module for determining the budget 1004 may re-determine the budget associated with communication of a subsequent video unit of multimedia data, and module for coding 1116 may code the subsequent video unit of multimedia data if the re-determined budget is less than the updated first and second levels of throughput.

Again, the video unit of multimedia data may comprise a video frame. ATs 1002 and 1004 may define a frame rate for communication of video frames of the multimedia data during a session, and upon skipping coding of a given video frame of multimedia data, the updating, re-determining and coding of a subsequent video frame may occur prior to a next cycle defined by the frame rate of the session. In this way, if a frame is skipped, module for coding 1116 need not wait until a next scheduled frame, but may code a frame prior to the next scheduled frame if the re-determined budget can be met by the updated throughputs measured for the uplink and downlink.

Although two ATs (1002 and 1004) are illustrated in FIG. 10, the techniques of this disclosure may be extended for any number of ATs in a VT conference. For each AT, the sending device may maintain a token bucket to determine the throughput for that given AT based on feedback. Accordingly, this disclosure contemplates determining a third level of throughput associated with multimedia data communication from a third access node of the network to a third device (e.g., a third AT) based on feedback from the third device to the first device (e.g., AT 1002), and coding the video unit of the multimedia data when the budget is less than the first, second and third levels of throughput. In this case, AT 1002 may maintaining at least three token buckets, wherein a first token bucket stores information indicative of the first level of throughput, the second token bucket stores information indicative of the second level of throughput, and the third token bucket stores information indicative of the third level of throughput.

On the receiver side, module for receiving 1126 of apparatus 1004 may receive first multimedia data sent from AT 1002 to 1004, wherein the first multimedia data is communicated to AT 1004 from a network node of network 1006 via downlink 1008. Module for determining throughput 1122 may measure throughput of the downlink over an observation window, and module for transmitting 1124 may sends from the second device to the first device information indicative of a level of throughput measured on the downlink over the observation window. This feedback communication information indicative of a level of throughput is shown in FIG. 10 by the dotted lines. A number of techniques for communicating this feedback from AT 1004 to 1002 are discussed above. In one example, however, module for transmitting 1124 piggybacks the information indicative of a level of throughput with multimedia content that is captured, coded and communicated from AT 1004 to AT 1002. In this case, module for transmitting 1124 may send second multimedia data from AT 1004 to AT 1002 and piggyback the information indicative of the level of throughput with the second multimedia data.

Figure 11:
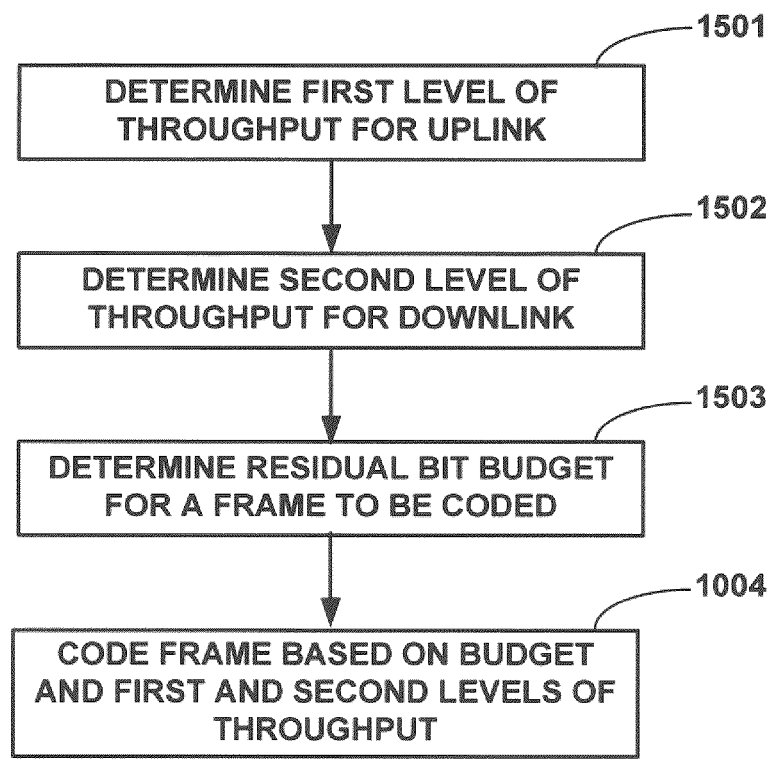
FIGS. 11-13 are flow diagrams consistent with techniques of this disclosure.
Figure 12:
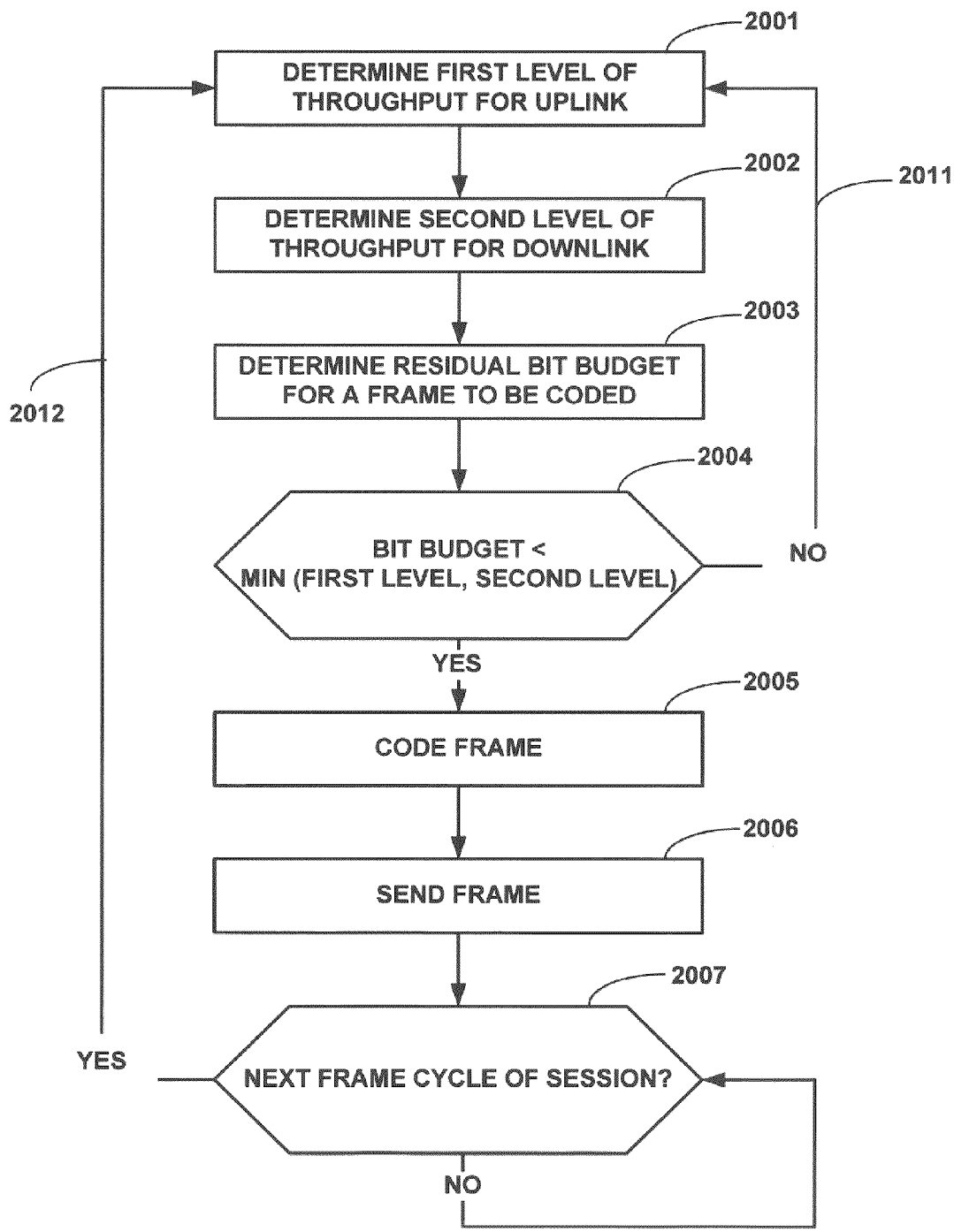
Figure 13:
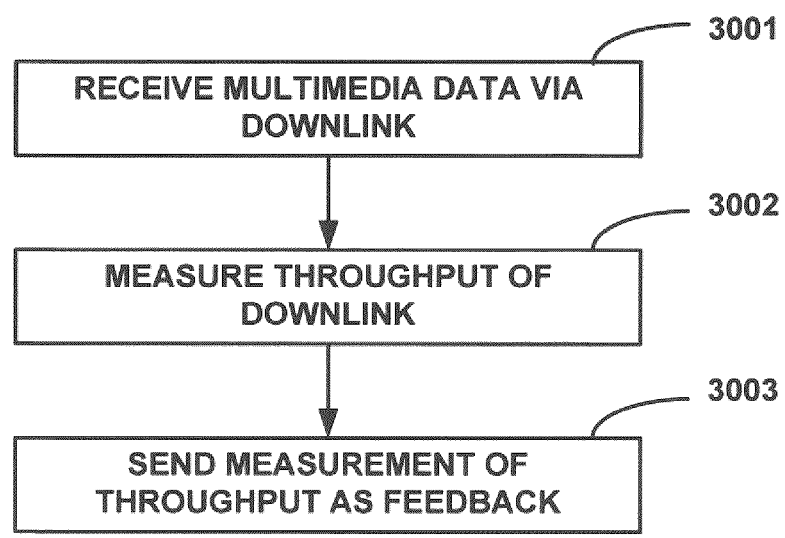

FIGS. 11-13 are flow diagrams consistent with techniques of this disclosure. As shown in FIG. 11, module 1110 of AT 1002 determines a first level of throughput for uplink 1007 (1501). To do this, module 1110 may measure the amount of data associated with the packets sent over uplink 1007 over the observation window, e.g., by summing all data sent during that observation window. Thus, the measured throughput is a measure of data, e.g., an accumulation of data. In one example, the observation window may comprise an amount of time between two successive coded frames. In this case, the throughput of uplink 1007 defines an amount of data sent in that observation window. Module 1112 determines a second level of throughput for downlink 1008 (1502), e.g., based on feedback received from AT 1004. In this case, AT 1004 may measure the throughput on the downlink by accumulating data over an observation window, and feed this measurement back to AT 1002. Module 1114 determines a bit budget for a frame to be coded (1503), e.g., by comparing a current scene to the previously coded frame and defining a number of bits needed to code the current scene relative to the previous frame.

Module for coding 1116 codes a current frame (i.e., a frame of the current scene) based on the budget and the first and second levels of throughput. For example, module for coding 1116 may code the current frame to have a size that is a function of the budget and the first and second levels of throughput. If needed, the frame may be coded with less detail so that the coded frame uses less data than the budget, and therefore less data than a minimum of the throughputs on the uplink and the downlink. Alternatively, module for coding 1116 may code the current frame according to the budget if the budget is less than the first and second levels of throughput. In this later case, module for coding may not code the frame if the budget is greater than either the first or second levels of throughput.

As shown in FIG. 12, module 1110 of AT 1002 determines a first level of throughput for uplink 1007 (2001). Module 1112 determines a second level of throughput for downlink 1008 (2002), e.g., based on feedback received from AT 1004. Module 1114 determines a bit budget for a frame to be coded (2003).

In FIG. 12, if the bit budget is less than a minimum of the first and second levels of throughput (yes branch of 2004), module 1116 codes the frame (2005), and module 1118 sends the frame (2006). Module 1116 then waits for a next frame cycle of the session (2007). The frame cycle may be negotiated between ATs 1002 and 1004 for a multimedia telephony session.

Loop 2011 is independent of loop 2012. This means that the actual frame rate may be adapted by the algorithm of FIG. 12 relative to the negotiated frame rate. In some cases, loop 2011 may take longer than the negotiated frame cycle, in which case, the algorithm of FIG. 12 adapts the frame rate to accommodate available throughput on the uplink and downlink. In other cases, the loop of 2011 may add a short delay for a frame, where the delay is within a time associated with the negotiated frame rate. In the later case, module 1116 may codes the frame (2005), and module 1118 may send the frame (2006) with a slight delay relative to an expected frame. For example, the negotiated frame rate may be 10 frames per second, causing expected frames to be coded every 100 milliseconds. If throughput is insufficient (no branch of 2004), the loop 2011 may continue every 2 milliseconds. In this case, once throughput is sufficient (yes branch of 2004) a frame is coded (2005) and sent (2006). In this case, the sent frame may be (100+2N) milliseconds from a previously transmitted frame, where N represents the number of cycles through loop 2011 before throughput is found to be sufficient.

As shown in FIG. 13, module 1126 of AT 1004 receives multimedia data via downlink 1008 (3001). Module 1122 measures throughput of downlink 1008 (3002). Module 1124 sends a measurement of the throughput of downlink 1008 as feedback to AT 1002 (3003). In this way, AT 1004 measures downlink throughput and feeds this information back to AT 1002 for use in determining whether and to what extent adaptation should be made for video information of a multimedia telephony session as described herein.

Figure 14:
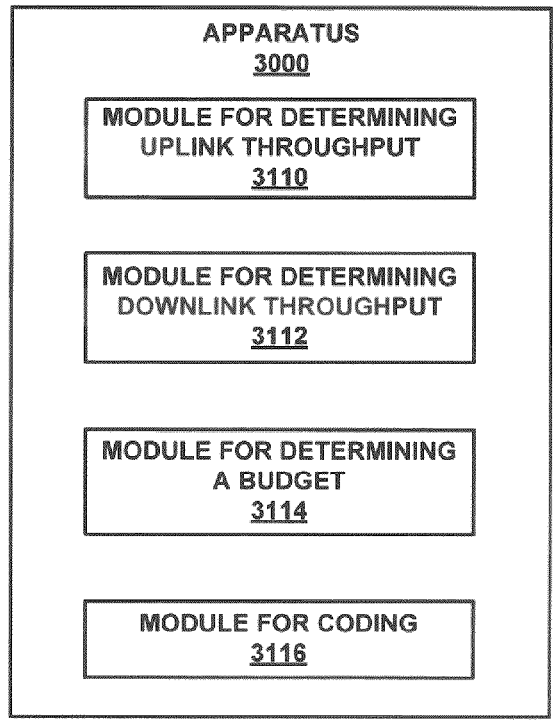
FIGS. 14 and 15 are block diagrams of apparatuses that may be used to practice aspects of this disclosure.
Figure 15:
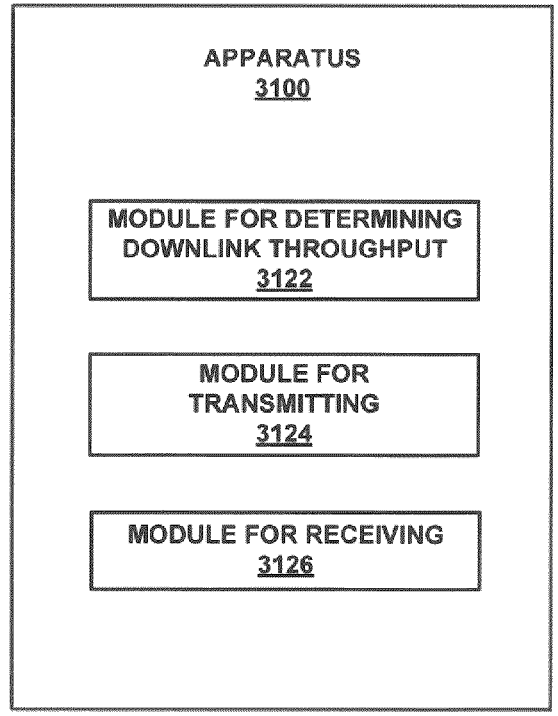

FIGS. 14 and 15 are block diagrams of apparatuses that may be used to practice aspects of this disclosure. Apparatuses 3000 and 3100 may comprise ATs, as discussed above, or may comprise one or more circuits, such as a chip set, that forms a part of ATs to provide the functionality of this disclosure to such ATs. As shown in FIG. 14, apparatus 3000 includes a module for determining uplink throughput 3110, a module for determining downlink throughput 3112, a module for determining a budget 3114, and a module for coding 3116.

Module for determining uplink throughput 3110 determines a first level of throughput associated with multimedia data communication from apparatus 3000 to a first access node of a network over an uplink. Module for determining downlink throughput 3112 determines a second level of throughput associated with multimedia data communication from a second access node of the network over a downlink, e.g., based on feedback from an access terminal. Module for determining the budget 3114 determines a budget associated with communication of a video unit of the multimedia data. Module for coding 1116 codes the video unit of the multimedia data based on the budget and the first and second levels of throughput.

As shown in FIG. 15, apparatus 3100 includes a module for determining downlink throughput 3122, a module for transmitting 3124, and a module for receiving 3126. Module for receiving 3126 receives first multimedia data over a downlink. Module for determining downlink throughput 3122 may comprise a throughput measuring module to measure throughput from the network on the downlink over an observation window. Module for transmitting 3124 may comprise a transmitter module that sends information indicative of a level of throughput measured from the network on the downlink over the observation window.

A number of techniques and examples have been described. One or more of the techniques described herein may be implemented in hardware, software, firmware, or combinations thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to a single processor or multiple processors, including any of the foregoing structure or any other structure suitable for implementation of the techniques described herein. In addition, in some aspects, the functionality described herein may be provided within dedicated software modules or hardware modules configured for performing the techniques described herein.

Steps of a method or algorithm described in connection with the aspects disclosed herein may be embodied directly in hardware, in a software module executed by a processor, or in a combination of the two. A software module (e.g., including executable instructions and related data) and other data may reside in a storage medium (e.g., data memory) such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Again, in some aspects any suitable computer-program product may comprise a computer-readable medium comprising codes (e.g., executable by at least one computer) relating to one or more of the aspects of the disclosure. In some aspects, a computer program product may comprise packaging materials.

If implemented in hardware, the techniques of this disclosure may be directed to an apparatus, such as a circuit or device configured to perform the techniques described herein. Accordingly, this disclosure also contemplates one or more circuits configured to perform the techniques described herein. In this case, an apparatus comprising the one or more circuits may be a component of an AT that is designed to provide the functionality of this disclosure to the AT.

Various aspects of the disclosure have been described. These and other aspects are within the scope of the following claims.

The invention claimed is:

1. A method for communication of multimedia data, the method comprising:
   determining a first level of throughput associated with multimedia data communication from a first access terminal to a network;
   determining a second level of throughput associated with multimedia data communication from the network to a second access terminal based on feedback from the second access terminal to the first access terminal via the network;
   determining a budget associated with communication of a video unit of the multimedia data; and
   coding the video unit of the multimedia data based on the budget and the first and second levels of throughput.

2. The method of claim 1, wherein coding the video unit of the multimedia data based on the budget and the first and second levels of throughput comprises:
   coding the video unit to have a size that is a function of the budget and the first and second levels of throughput.

3. The method of claim 1, wherein coding the video unit of the multimedia data based on the budget and the first and second levels of throughput comprises:

coding the video unit according to the budget if the budget is less than the first and second levels of throughput.

4. The method of claim 1, wherein the network comprises a first access point that sends and receives data to and from the first access terminal; and
a second access point that sends and receives data to and from the second access terminal, wherein the first and second access points are communicatively coupled to one another in the network.

5. The method of claim 1, further comprising sending the coded video unit of the multimedia data from the first access terminal to the second access terminal via the network.

6. The method of claim 1, further comprising:
maintaining at least two token buckets at the first access terminal, wherein a first token bucket stores information indicative of the first level of throughput and the second token bucket stores information indicative of the second level of throughput,
wherein coding the video unit of the multimedia data comprises coding the video unit with a size that is a function of the budget and occupancies of the first and second token buckets.

7. The method of claim 6, further comprising:
updating the first token bucket to reflect the first level of throughput measured at the first access terminal; and
updating the second token bucket to reflect the second level of throughput measured at the second access terminal.

8. The method of claim 7, wherein updating the first and second token buckets is based on negotiated quality of service (QoS) between the first and second access terminals, current buffer occupancy of the first and second token buckets and elapsed time.

9. The method of claim 6, further comprising:
reducing contents from at least one of the first and second token buckets in the first access terminal upon coding the video unit of multimedia data.

10. The method of claim 1, wherein the video unit of multimedia data comprises a video frame.

11. The method of claim 10, further comprising:
coding audio information associated with the video frame and sending the coded audio information from the first access terminal to the second access terminal over the network regardless of whether the video frame is coded.

12. The method of claim 1, further comprising:
skipping coding of the video unit of multimedia data if the budget is greater than either the first level of throughput or the second level of throughput.

13. The method of claim 12, further comprising upon skipping coding of the video unit of multimedia data:
updating the first level of throughput based on measurements at the first access terminal;
updating the second level of throughput based on measurements at the second access terminal;
re-determining the budget associated with communication of a subsequent video unit of multimedia data; and
coding the subsequent video unit of multimedia data if the re-determined budget is less than the updated first and second levels of throughput.

14. The method of claim 13,
wherein the video unit of multimedia data comprises a video frame,
wherein the first and second access terminals define a frame rate for communication of video frames of the multimedia data during a session, and
wherein upon skipping coding of a given video frame of multimedia data, the updating, re-determining and coding of a subsequent video frame occur prior to a next cycle defined by the frame rate of the session.

15. The method of claim 1, further comprising:
determining a third level of throughput associated with multimedia data communication from the network to a third access terminal based on feedback from the third access terminal to the first access terminal via the network; and
coding the video unit of the multimedia data when the budget is less than the first, second and third levels of throughput.

16. The method of claim 15, further comprising:
maintaining at least three token buckets at the first access terminal, wherein a first token bucket stores information indicative of the first level of throughput, the second token bucket stores information indicative of the second level of throughput, and the third token bucket stores information indicative of the third level of throughput.

17. An apparatus for communication of multimedia data, the apparatus comprising:
means for determining a first level of throughput associated with multimedia data communication from the apparatus to a network;
means for determining a second level of throughput associated with multimedia data communication from the network to an access terminal based on feedback from the access terminal to the apparatus via the network;
means for determining a budget associated with communication of a video unit of the multimedia data; and
means for coding the video unit of the multimedia data based on the budget and the first and second levels of throughput.

18. The apparatus of claim 17, wherein means for coding the video unit of the multimedia data based on the budget and the first and second levels of throughput comprises:
means for coding the video unit to have a size that is a function of the budget and the first and second levels of throughput.

19. The apparatus of claim 17, wherein means for coding the video unit of the multimedia data based on the budget and the first and second levels of throughput comprises:
means for coding the video unit according to the budget if the budget is less than the first and second levels of throughput.

20. The apparatus of claim 17, wherein the network comprises:
a first access point that sends and receives data to and from the apparatus; and
a second access point that sends and receives data to and from the access terminal, wherein the first and second access points are communicatively coupled to one another in the network.

21. The apparatus of claim 17, further comprising means for sending the coded video unit of the multimedia data from the apparatus to the access terminal via the network.

22. The apparatus of claim 17, further comprising:
means for maintaining at least two token buckets at the apparatus, wherein a first token bucket stores information indicative of the first level of throughput and the second token bucket stores information indicative of the second level of throughput,
wherein means for coding the video unit of the multimedia data comprises means for coding the video unit with a size that is a function of the budget and occupancies of the first and second token buckets.

23. The apparatus of claim 22, further comprising:
means for updating the first token bucket to reflect the first level of throughput measured at the apparatus; and
means for updating the second token bucket to reflect the second level of throughput measured at the access terminal.

24. The apparatus of claim 23, wherein means for updating the first and second token buckets comprises means for updating based on negotiated quality of service (QoS) between the apparatus and the access terminal, current buffer occupancy of the first and second token buckets and elapsed time.

25. The apparatus of claim 17, wherein the apparatus comprises one or more integrated circuits.

26. The apparatus of claim 22, further comprising:
means for reducing contents from at least one of the first and second token buckets in the apparatus upon coding the video unit of multimedia data.

27. The apparatus of claim 17, wherein the video unit of multimedia data comprises a video frame.

28. The apparatus of claim 27, further comprising:
means for coding audio information associated with the video frame and means for sending the coded audio information from the apparatus to the access terminal over the network regardless of whether the video frame is coded.

29. The apparatus of claim 17, further comprising:
means for skipping coding of the video unit of multimedia data if the budget is greater than either the first level of throughput or the second level of throughput.

30. The apparatus of claim 29, further comprising upon skipping coding of the video unit of multimedia data:
means for updating the first level of throughput based on measurements at the apparatus;
means for updating the second level of throughput based on measurements at the access terminal;
means for re-determining the budget associated with communication of a subsequent video unit of multimedia data; and
means for coding the subsequent video unit of multimedia data if the re-determined budget is less than the updated first and second levels of throughput.

31. The apparatus of claim 30,
wherein the video unit of multimedia data comprises a video frame,
wherein the apparatus and the access terminal define a frame rate for communication of video frames of the multimedia data during a session, and
wherein upon skipping coding of a given video frame of multimedia data, the updating, re-determining and coding of a subsequent video frame occur prior to a next cycle defined by the frame rate of the session.

32. The apparatus of claim 17, further comprising:
means for determining a third level of throughput associated with multimedia data communication from the network to another access terminal based on feedback from the another access terminal to the apparatus via the network; and
means for coding the video unit of the multimedia data when the budget is less than the first, second and third levels of throughput.

33. The apparatus of claim 32, further comprising:
means for maintaining at least three token buckets at the apparatus, wherein a first token bucket stores information indicative of the first level of throughput, the second token bucket stores information indicative of the second level of throughput, and the third token bucket stores information indicative of the third level of throughput.

34. A computer program product including a non-transitory computer readable medium comprising instructions that are executable to:
determine a first level of throughput associated with multimedia data communication from a first access terminal to a network;
determine a second level of throughput associated with multimedia data communication from the network to a second access terminal based on feedback from the second access terminal to the first access terminal via the network;
determine a budget associated with communication of a video unit of the multimedia data; and
code the video unit of the multimedia data based on the budget and the first and second levels of throughput.

* * * * *